United States Patent
McEldowney et al.

(10) Patent No.: US 11,199,721 B1
(45) Date of Patent: Dec. 14, 2021

(54) POLARIZATION VOLUME HOLOGRAM LENS

(71) Applicant: FACEBOOK TECHNOLOGIES, LLC, Menlo Park, CA (US)

(72) Inventors: Scott McEldowney, Redmond, WA (US); Lu Lu, Redmond, WA (US); Babak Amirsolaimani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 343 days.

(21) Appl. No.: 16/224,762

(22) Filed: Dec. 18, 2018

(51) Int. Cl.
    *G02B 27/28* (2006.01)
    *G03H 1/02* (2006.01)
    *G02B 5/32* (2006.01)
    *G02B 5/30* (2006.01)
    *G02B 27/01* (2006.01)
    *G02B 3/10* (2006.01)

(52) U.S. Cl.
    CPC ......... *G02B 27/286* (2013.01); *G02B 5/3016* (2013.01); *G02B 5/3083* (2013.01); *G02B 5/32* (2013.01); *G02B 27/0172* (2013.01); *G03H 1/0248* (2013.01); *G02B 3/10* (2013.01)

(58) Field of Classification Search
    CPC ...... G02B 3/10; G02B 5/3016; G02B 5/3083; G02B 5/32; G02B 27/286; G03H 1/0248
    See application file for complete search history.

(56) References Cited

U.S. PATENT DOCUMENTS

| | | | | |
|---|---|---|---|---|
| 7,719,643 | B2* | 5/2010 | Kashima | G02B 5/3016 349/117 |
| 2015/0301356 | A1* | 10/2015 | Tabirian | G02B 6/3534 623/6.31 |
| 2015/0331167 | A1* | 11/2015 | Escuti | G02B 5/32 359/3 |

(Continued)

OTHER PUBLICATIONS

Lee et al., "Recent progress in Pancharatnam-Berry phase optical elements and the applications for virtual/augmented realities," Opt. Data Process. Storage 2017; 3:79-88, DOI 10.1515/odps-2017-0010. (Year: 2017).*

(Continued)

*Primary Examiner* — Nicholas R. Pasko
(74) *Attorney, Agent, or Firm* — Morgan, Lewis & Bockius LLP

(57) ABSTRACT

A lens includes a substrate with optically anisotropic molecules arranged in helical configurations between first and second surfaces. A first portion of the substrate includes a first helical structure having a first phase and a second helical structure adjacent to the first helical structure having a second phase. A difference between the first and second phases corresponds to a first phase difference. A second portion includes a third helical structure having a third phase and a fourth helical structure adjacent to the third helical structure having a fourth phase. A difference between the third and fourth phases corresponds to a second phase difference. A third portion includes a fifth helical structure having a fifth phase and a sixth helical structure adjacent to the fifth helical structure having a sixth phase. A difference between the fifth and sixth phases corresponds to a third phase difference.

20 Claims, 18 Drawing Sheets

(56) References Cited

U.S. PATENT DOCUMENTS

| | | | | |
|---|---|---|---|---|
| 2016/0011353 A1* | 1/2016 | Escuti | ............... | G02B 5/3083 |
| | | | | 359/15 |
| 2016/0047956 A1* | 2/2016 | Tabirian | ............... | G02B 5/001 |
| | | | | 385/11 |
| 2017/0373459 A1* | 12/2017 | Weng | ............... | G02B 30/25 |
| 2018/0107000 A1* | 4/2018 | Sung | ............... | G02B 27/283 |
| 2018/0143470 A1* | 5/2018 | Oh | ............... | B81C 1/0046 |
| 2018/0143485 A1* | 5/2018 | Oh | ............... | G02B 27/4205 |
| 2018/0164480 A1* | 6/2018 | Yoshida | ............... | G02B 6/0055 |
| 2018/0210222 A1* | 7/2018 | Seo | ............... | G02B 5/3025 |
| 2018/0239177 A1* | 8/2018 | Oh | ............... | G02B 6/0055 |
| 2019/0317352 A1* | 10/2019 | Saitoh | ............... | G02F 1/13362 |
| 2020/0271839 A1* | 8/2020 | Saitoh | ............... | G02B 27/02 |
| 2021/0011319 A1* | 1/2021 | Sato | ............... | G02F 1/13363 |
| 2021/0026049 A1* | 1/2021 | Saitoh | ............... | G02B 5/1809 |

OTHER PUBLICATIONS

Ke et al., "Optical integration of Pancharatnam-Berry phase lens and dynamical phase lens," Appl. Phys. Lett. 108, 101102 (2016); https://doi.org/10.1063/1.4943403. (Year: 2016).*

* cited by examiner

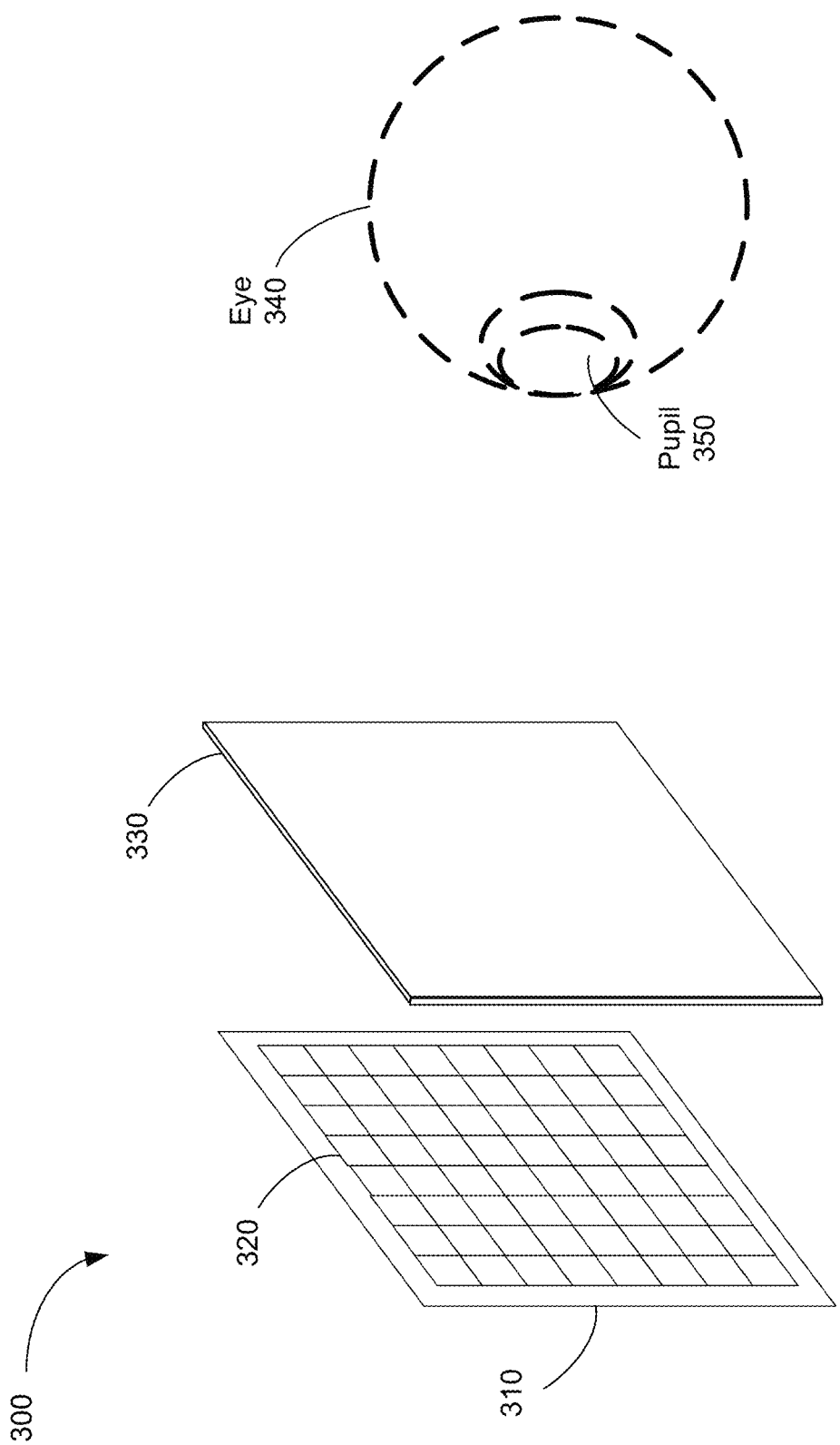

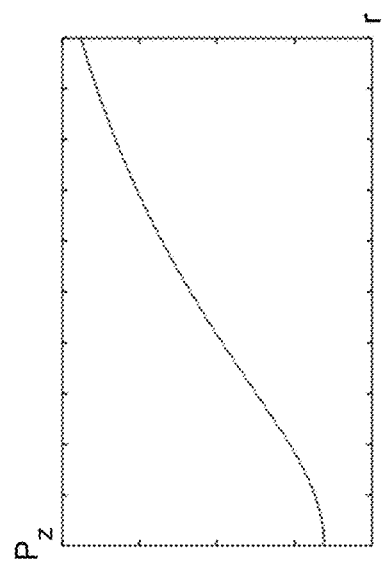
Figure 4G
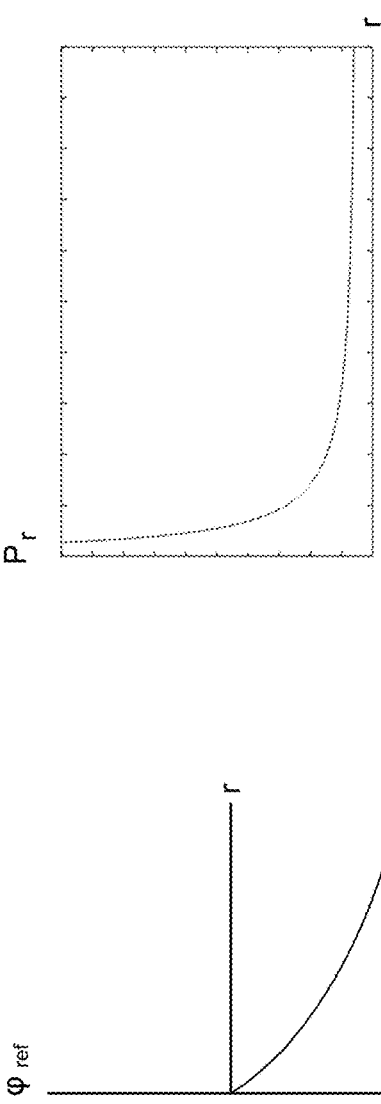
Figure 4H
Figure 4I
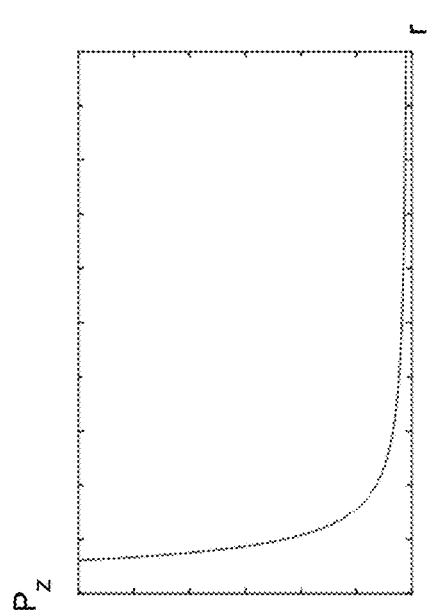
Figure 4J
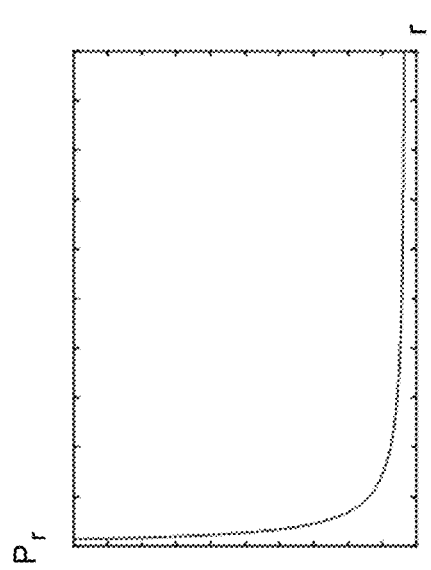
Figure 4K
Figure 4L
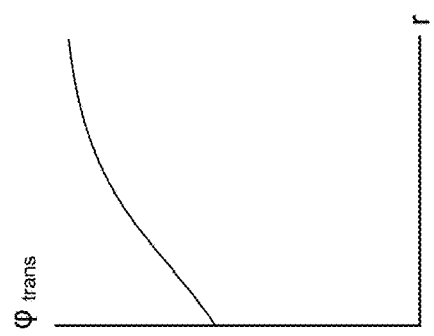

POLARIZATION VOLUME HOLOGRAM LENS

TECHNICAL FIELD

This relates generally to display devices, and more specifically to head-mounted display devices.

BACKGROUND

Head-mounted display devices (also called herein head-mounted displays) are gaining popularity as means for providing visual information to user. However, the size and weight of conventional head-mounted displays have limited their applications.

SUMMARY

Accordingly, there is a need for head-mounted displays that are compact and light, thereby enhancing the user's virtual-reality and/or augmented reality experience.

The above deficiencies and other problems associated with conventional optical elements and optical assemblies are reduced or eliminated by the disclosed lens. In some embodiments, the lens is included in a display device. In some embodiments, the device is a head-mounted display device. In some embodiments, the device is portable.

In certain embodiments, the lens includes one or more anisotropic optical elements, such as polarization volume holographic (PVH) elements (e.g., lenses) having optical properties including polarization selectivity, wavelength selectivity and angular selectivity. The one or more PVH elements are thinner and lighter than conventional optical elements and/or assemblies of optical elements with similar performance features. Thus, replacing conventional optical elements and/or assemblies in head-mounted displays with PVH elements can reduce the size and weight of the head-mounted displays.

In accordance with some embodiments, a lens includes an optically transparent substrate having a first optical surface and a second optical surface opposite to the first optical surface. The optically transparent substrate includes optically anisotropic molecules between the first optical surface and the second optical surface. The optically anisotropic molecules are arranged in helical configurations. The optically transparent substrate includes a first portion, a second portion and a third portion, and the second portion is distinct from the first portion and is located around the first portion, and the third portion is distinct from the first portion and the second portion and is located around the second portion. The first portion includes a first helical structure having a first phase on a reference plane parallel to the first optical surface and a second helical structure adjacent to the first helical structure having a second phase distinct from the first phase on the reference plane. A difference between the first phase and the second phase corresponds to a first phase difference. The second portion includes a third helical structure having a third phase on the reference plane and a fourth helical structure adjacent to the third helical structure having a fourth phase distinct from the third phase on the reference plane. A difference between the third phase and the fourth phase corresponds to a second phase difference distinct from the first phase difference. The third portion includes a fifth helical structure having a fifth phase on the reference plane and a sixth helical structure adjacent to the fifth helical structure having a sixth phase distinct from the fifth phase on the reference plane. A difference between the fifth phase and the sixth phase corresponds to a third phase difference distinct from the first phase difference and the second phase difference.

In accordance with some embodiments, a method includes receiving first light of a first circular polarization and second light of a second circular polarization distinct from the first polarization with a lens. The lens includes an optically transparent substrate having a first optical surface and a second optical surface opposite to the first optical surface. The optically transparent substrate includes optically anisotropic molecules between the first optical surface and the second optical surface, and the optically anisotropic molecules are arranged in helical configurations. The optically transparent substrate includes a first portion, a second portion and a third portion. The second portion is distinct from the first portion and is located around the first portion, and the third portion is distinct from the first portion and the second portion and is located around the second portion.

In some embodiments, the first portion includes a first helical structure having a first phase on a reference plane parallel to the first optical surface and a second helical structure adjacent to the first helical structure having a second phase distinct from the first phase on the reference plane. A difference between the first phase and the second phase corresponds to a first phase difference. The second portion includes a third helical structure having a third phase on the reference plane and a fourth helical structure adjacent to the third helical structure having a fourth phase distinct from the third phase on the reference plane. A difference between the third phase and the fourth phase corresponds to a second phase difference distinct from the first phase difference. The third portion includes a fifth helical structure having a fifth phase on the reference plane and a sixth helical structure adjacent to the fifth helical structure having a sixth phase distinct from the fifth phase on the reference plane. A difference between the fifth phase and the sixth phase corresponds to a third phase difference distinct from the first phase difference and the second phase difference. The method also includes focusing, with the lens, the first light while transmitting the second light through the lens without focusing the second light, or defocusing, with the lens, the first light while transmitting the second light through the lens without defocusing the second light.

In accordance with some embodiment, a method for making a lens including arranging a layer of optically anisotropic molecules in helical configurations. The layer of optically anisotropic molecules includes a first portion, a second portion, and a third portion. The second portion is distinct from the first portion and is located around the first portion, and the third portion is distinct from the first portion and the second portion and is located around the second portion. The first portion includes a first helical structure having a first phase on a reference plane and a second helical structure adjacent to the first helical structure having a second phase distinct from the first phase on the reference plane. A difference between the first phase and the second phase corresponds to a first phase difference. The second portion includes a third helical structure having a third phase on the reference plane and a fourth helical structure adjacent to the third helical structure having a fourth phase distinct from the third phase on the reference plane. A difference between the third phase and the fourth phase corresponds to a second phase difference distinct from the first phase difference. The third portion includes a fifth helical structure having a fifth phase on the reference plane and a sixth helical structure adjacent to the fifth helical structure having a sixth phase distinct from the fifth phase on the reference plane. A difference between the fifth phase and the sixth phase corresponds to a third phase difference distinct from the first phase difference and the second phase difference. The method also includes firming the layer of optically anisotropic molecules.

Thus, the disclosed embodiments provide PVH lenses and methods of making such.

Embodiments according to the invention are in particular disclosed in the attached claims directed to a lens, a display device and corresponding methods, wherein any feature mentioned in one claim category, e.g. device, can be claimed in another claim category, e.g. in a method or use claim, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 4G is a graphical illustration of a phase angle of helical structures of a reflective lens in accordance with some embodiments.

FIG. 4H is a graphical illustration of radial pitch of helical structures of a reflective lens in accordance with some embodiments.

FIG. 4I is a graphical illustration of helical pitch of helical structures of a reflective lens in accordance with some embodiments.

FIG. 4J is a graphical illustration of a phase angle of helical structures of a reflective lens in accordance with some embodiments.

FIG. 4K is a graphical illustration of radial pitch of helical structures of a transmissive lens in accordance with some embodiments.

FIG. 4L is a graphical illustration of helical pitch of helical structures of a transmissive lens in accordance with some embodiments.

These figures are not drawn to scale unless indicated otherwise.

DETAILED DESCRIPTION

There is a need for polarization volume holographic (PVH) lenses with advanced performance features including polarization selectivity, wavelength selectivity and angular selectivity. Such PVH lenses, or lens assemblies including such PVH lenses, are lighter and thinner than conventional optical assemblies having similar performance features.

The disclosed embodiments provide for reflection and transmissive PVH lenses with polarization selectivity, wavelength selectivity and/or angular selectivity.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both light surfaces, but they are not the same surface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
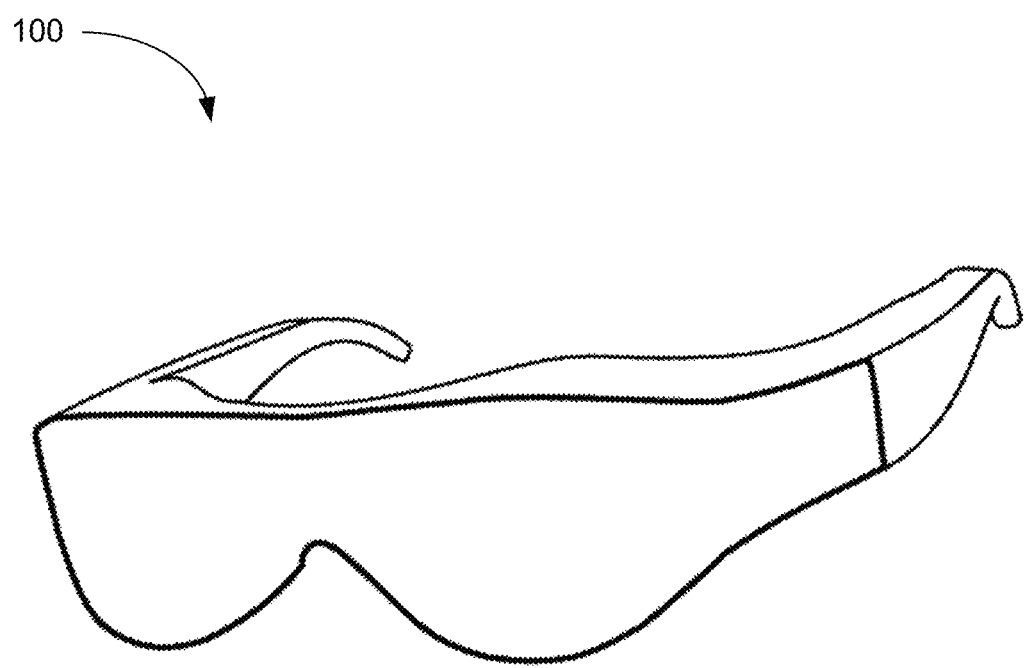
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
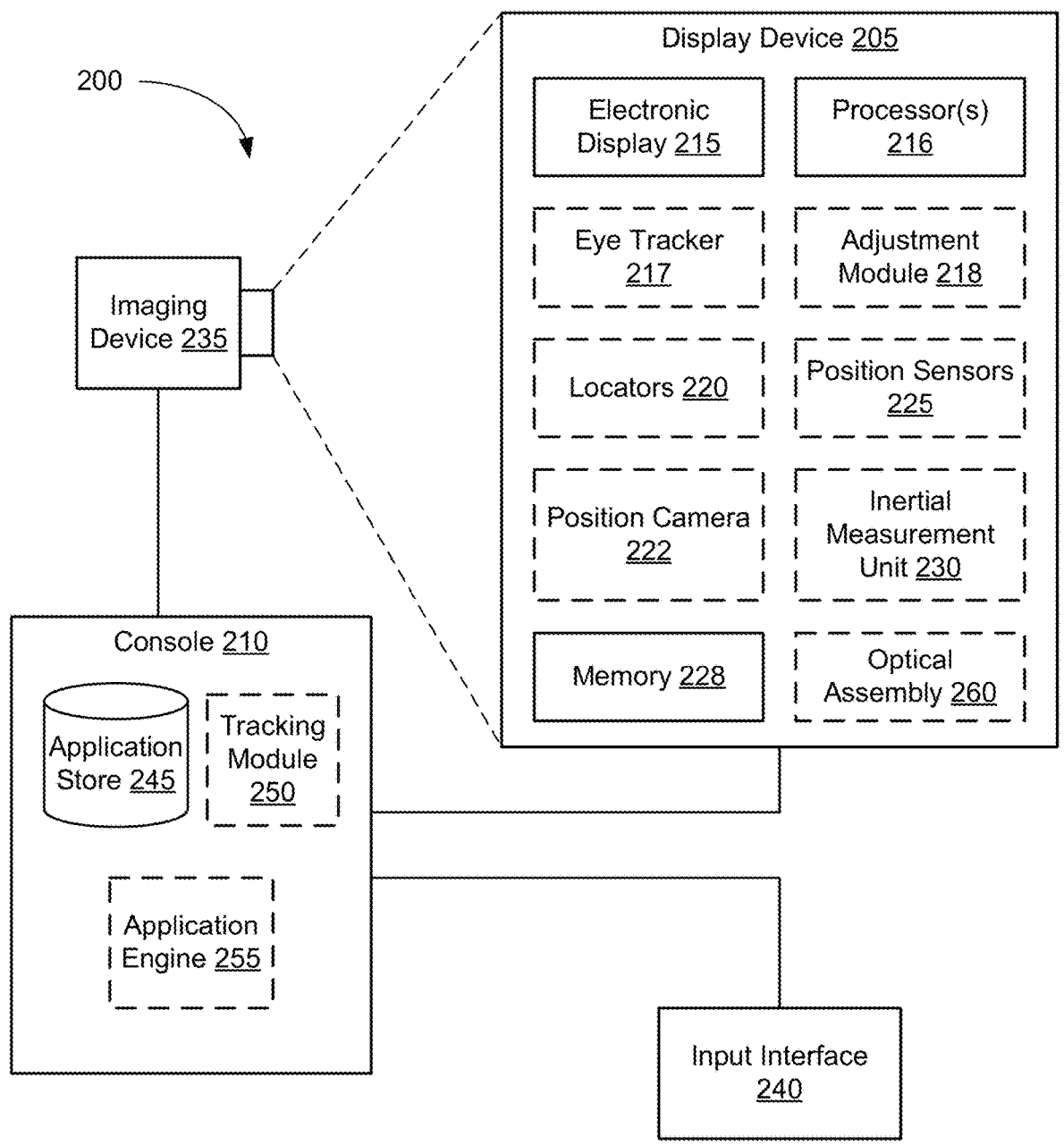
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and one or more lenses 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from emission intensity array (or directly from emission device array 310), and direct the modified image light to a location of pupil 350. The one or more lenses 330 include at least one PVH lens according to some embodiments.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4B:
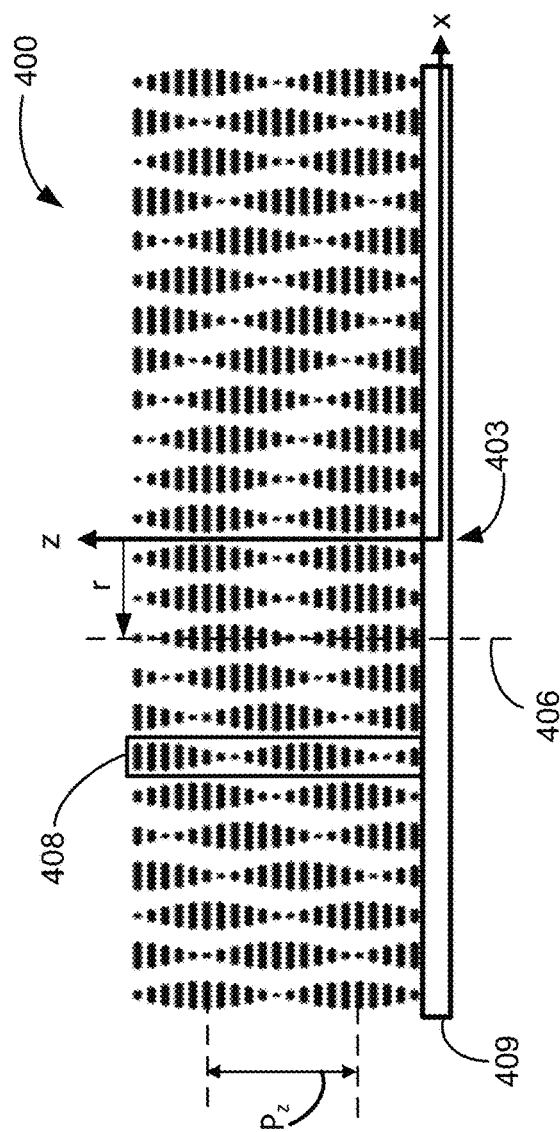
FIGS. 4A-4E are schematic diagrams illustrating a lens in accordance with some embodiments.
Figure 4A:
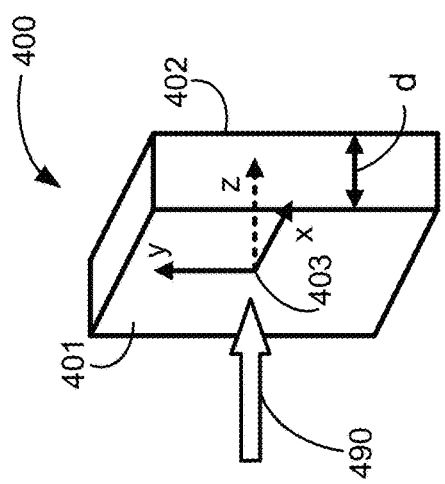

FIGS. 4A-4E are schematic diagrams illustrating PVH lens 400 in accordance with some embodiments. In some embodiments, PVH lens 400 corresponds to part or all of one or more lenses 330 described above with respect to FIG. 3. FIG. 4A illustrates a three dimensional view of PVH lens 400 with incoming light 490 entering the lens along the z-axis. PVH lens 400 is a substantially flat lens having two opposing optical surfaces 401, 402 that are substantially flat. PVH lens 400 has width d along the z-axis. FIG. 4B illustrates an x-z cross-sectional view of PVH lens 400. PVH lens 400 includes photoalignment layer 409 (e.g., a layer including organic or inorganic compounds including photosensitive groups) and helical structures 408 formed of optically anisotropic molecules. Photoalignment layer 409 is formed by adding a layer of photoalignment material (PAM) on one of the optical surfaces 401 and 402. The PAM layer is then exposed to an alignment light (e.g., linearly polarized light) with a desired intensity and incident angle. The alignment light is gradually scanned over the layer of PAM while rotating polarization of the alignment light. The alignment light creates a cycloidal pattern on the layer of PAM (e.g., cycloidal patterns described below with respect to FIG. 4D). Alternatively, photoalignment layer 409 is formed by exposing the layer of PAM to an interference pattern of two orthogonally circularly polarized alignment lights. The cycloidal pattern is created by placing an optical element (e.g., a lens) on an optical path of one of the alignment lights. After preparation of photoalignment layer 409, a layer of optically anisotropic molecules is applied onto photoalignment layer 409 forming helical structures 408. The cycloidal pattern of photoalignment layer 409 defines the orientation of helical structures 408. After formation of helical structures 408, the layer of optically anisotropic molecules is firmed (e.g., fixed, set, or cured) to form a polymer. In some embodiments, the firming includes thermal or UV curing. In some embodiments, helical structures 408 are formed of liquid crystals, such as cholesteric liquid crystals. Helical structures 408 are aligned along helical axes 406 that are substantially parallel to the z-axis. In some embodiments, the optically anisotropic molecules are arranged in a rotational direction (forming a helical twist) about their respective helical axes 406 throughout the optically transparent substrate. Helical structures 408 define helical pitch $P_z$, used herein to refer to a distance between two optically anisotropic molecules that are rotated 180 degrees with respect to one another.

A PVH lens adds positive (e.g. converging) or negative (e.g., diverging) optical power to incident light having certain properties. For example, the PVH lens may change or affect the direction and/or polarization of light in a certain spectral range (e.g., wavelength selectivity), light having an incident angle in a certain range and having a certain circular polarization (e.g., polarization selectivity) (referred to hereafter as "subject light") but does not change or affect the direction and polarization of light outside the certain spectral range, outside the certain incident angle range and/or having circular polarization opposite to the certain polarization (referred to hereafter as "unaffected light"). In some embodiments, the certain polarization of the subject light has a handedness that corresponds to the helical twist of a helical structure before impinging on the PVH lens. When the subject light is incident on the PVH lens, the PVH lens interacts with the subject light and changes the direction of the light (e.g., focuses or defocuses light by refracting or reflecting the light). While interacting with the subject light, a transmissive PVH lens changes the polarization of the light (e.g., from a right-handed circular polarization (RCP) to a left-handed circular polarization (LCP) or vice versa), whereas a reflective PVH lens does not change the polarization of the subject light (e.g., RCP light is reflected as RCP light). On the other hand, the PVH lens transmits the unaffected light (e.g., light having a wavelength outside the particular spectral range associated with the PVH lens and/or having circular polarization with handedness opposite to the helical twist) without changing its direction or polarization. For example, a transmitting PVH lens changes polarization of RCP light to LCP light and simultaneously focuses or defocuses the light while transmitting LCP light without changing its polarization or direction. As another example, a reflective PVH lens reflects and focuses or defocuses RCP light without changing its polarization while transmitting LCP light without changing its direction or polarization. In contrast, a conventional reflective lens or a mirror changes the polarization of polarized incident light when reflecting the light. In some embodiments, in addition to being selective based on the circular polarization of light, a PVH lens is also wavelength selective and/or selective based on incident angle of the light. Optical properties of the PVH lens (e.g., focusing and/or defocusing power, reflective or transmissive) are based on variation of liquid crystal molecule orientation (e.g., variation of azimuthal angles of optical axes of liquid crystal molecules) across planes parallel to optical surfaces 401 and 402, as will be described below with respect to FIG. 4D. In addition, the optical properties of the PVH lens are dependent on an orientation of the helical axes and/or a helical pitch of a liquid crystal.

Figure 4C:
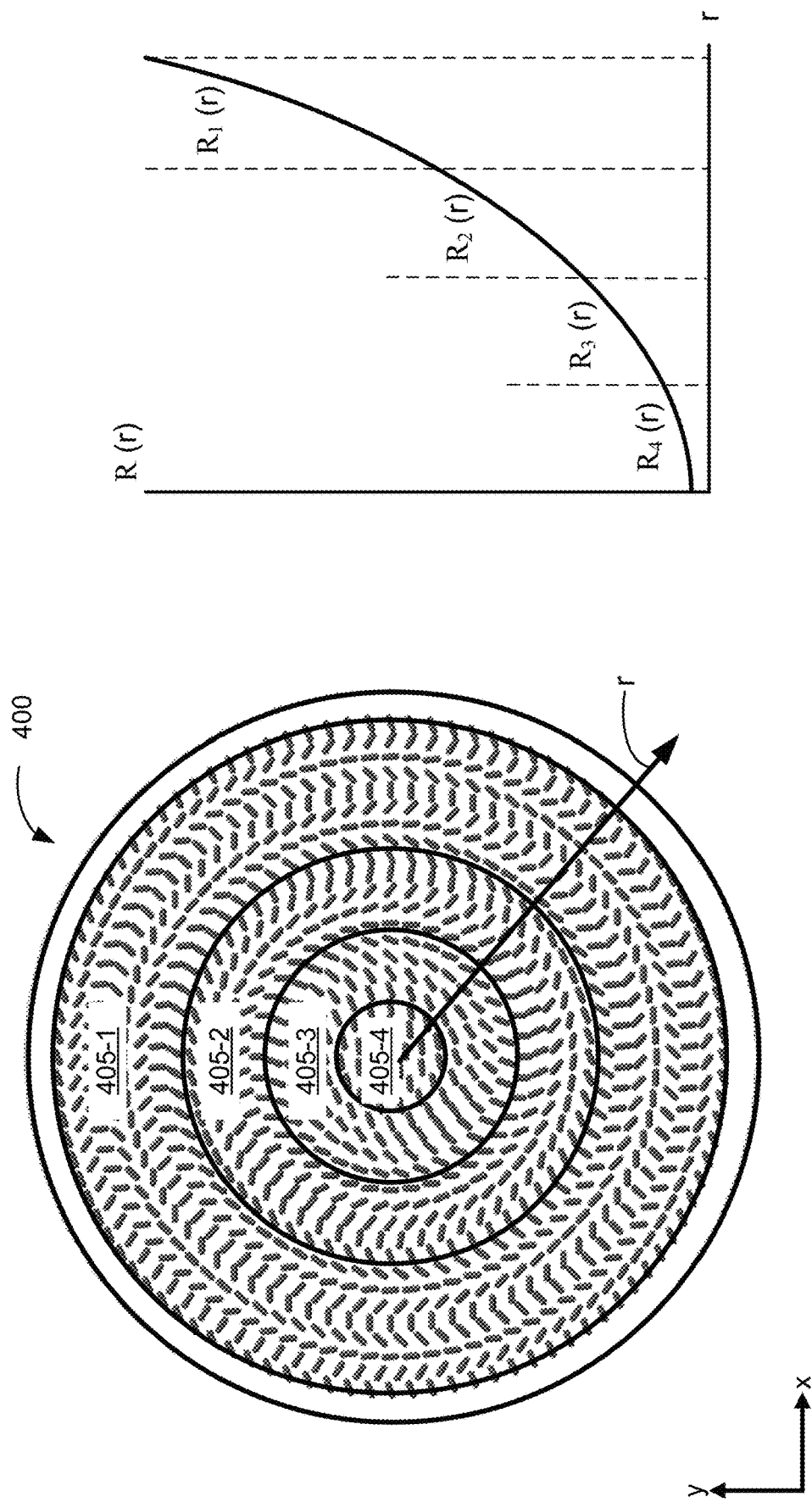

FIG. 4C is cross-sectional view of an x-y plane of PVH lens 400. PVH lens 400 includes two or more annular portions (e.g., portions 405-1, 405-2, 405-3 and 405-4). Portion 405-4 is located at a center of PVH lens 400. Portion 405-3 is located around portion 405-4, portion 405-2 is located around portion 405-3 and portion 405-1 is located around portion 405-2. In some embodiments, portions 405-1, 405-2, 405-3 and 405-4 have distinct retardance profiles $R_1(r)$, $R_2(r)$, $R_3(r)$, and $R_4(r)$, respectively, where r represents a distance along a radius of PVH lens 400 from a geometric center of PVH lens 400. Retardance or phase retardance at any point on the x-y plane represents an integrated effect of birefringence acting along the path of a light beam traversing PVH lens 400 in the z-direction through that point. Generally, when light having components of opposite polarizations (e.g., LCP and RCP) goes through a birefringent material, the two oppositely polarized components experience different refractive indices. For example, one of the components can be the subject light (or "extraordinary" light) and experiences birefringence defined by the difference between the "extraordinary" refractive index no and the "ordinary" refractive index no, while the other component can be the unaffected light (or "ordinary" light) and experiences an isotropic material with an effective refractive index $n_{eff}$, $$n_{eff} = \sqrt{\frac{2n_o^2 + n_e^2}{3}},$$

Thus the two components travel through the material with different velocities, resulting in a phase-angle difference between the two components when they exit the material, which is characterized by the retardance parameter associated with the material. In certain embodiments, the retardance parameters $R_1(r)$, $R_2(r)$, $R_3(r)$, and $R_4(r)$ in respective portions 405-1, 405-2, 405-3 and 405-4 have distinctive retardance profiles (for example, the average rate of change of the retardance parameter in each of portions 405-1, 405-2, 405-3 and 405-4 is distinct from that in any of the other portions).

In some embodiments, the retardance parameter represents the integrated effect of birefringence acting along the path of a light beam that traverses a sample of the optical material. In some embodiments, for PVH lens 400, the orientations of the liquid crystal molecules have distinct orientation patterns in the portions 405-1, 405-2, 405-3 and 405-4, respectively, resulting in the PVH lens 400 having distinct retardance profiles across the portions 405-1, 405-2, 405-3 and 405-4, respectively. In some embodiments, the retardance parameter R(r) for the PVH across the x-y plane, as shown in FIG. 4C, is proportional to $(n_e-n_o)$ and a thickness or distance of travel through the material, i.e., $$R(r) \propto (n_e-n_o)d \tag{1}$$

where $n_o$ corresponds to the ordinary refractive index and $n_e$ corresponds to the extraordinary refractive index of a birefringent material, and d is a distance of travel for the light through the material (e.g., thickness d shown in FIG. 4A). In certain embodiments, R(r) is also related to a rate of change of the phases or orientations of liquid crystal modules across the x-y plane (e.g., as described below with respect to FIG. 4D).

As mentioned above, the retardance parameters $R_1(r)$, $R_2(r)$, $R_3(r)$, and $R_4(r)$ in portions 405-1, 405-2, 405-3 and 405-4 of PVH lens 400 have distinct first, second, third and fourth retardance profiles in that, for example, they have different slopes representing different rate of variations with respect to the distance from a center axis r (e.g., the retardance increasing more and more rapidly from portion 405-4 to 405-1. As a result, portions 405-1, 405-2, 405-3 and 405-4 of PVH lens 400 not only have different ranges of retardance values, they also have different ranges for the rate of change of the retardance values. In some embodiments, $R_1(r)$, $R_2(r)$, $R_3(r)$, and $R_4(r)$ together form a continuously varying retardance R(r) across PVH lens 400, as shown in FIG. 4C. The retardance profiles corresponding to portions 405-1, 405-2, 405-3 and 405-4 together also form a continuously varying overall retardance profile. In some embodiments, the retardance profiles $R_1(r)$, $R_2(r)$, $R_3(r)$, and $R_4(r)$ are designed to focus or defocus subject light. For example, PVH lens 400 is configured to focus or defocus subject light having a first polarization and transmit unaffected light having a second polarization. Portion 405-1 having a first retardance profile corresponding to $R_1(r)$ may steer subject light at a first angle relative to an incident angle while transmitting unaffected light without changing its direction. Portion 405-2 having a second retardance profile corresponding to $R_2(r)$, distinct from the first retardance profile, may steer subject light at a second angle, distinct from the first angle, relative to the incident angle while transmitting unaffected light at the incident angle. Portion 405-3 having a third retardance profile corresponding to $R_3(r)$, distinct from the first and second retardance profiles, may steer subject light at a third angle, distinct from the first and second angles, relative to the incident angle of the incident light while transmitting unaffected light at the incident angle. Portion 405-4 has a fourth retardance profile corresponding to $R_4(r)$, distinct from the first, second and third retardance profiles, may steer subject light at a fourth angle, distinct from the first, second, and third angles, relative to the incident angle of the incident light while transmitting unaffected light at the incident angle. Portions 405-1, 405-2, 405-3 and 405-4 are configured to transmit unaffected light having the second circular polarization without focusing or defocusing the unaffected light (e.g., unaffected light having the second circular polarization experiences the $n_{eff}$ which does not change, subject light having the first circular polarization experiences the extraordinary birefringence. For example, the first circular polarization corresponds to RCP light and the second circular polarization corresponds to LCP, or vice versa.

In some embodiments, PVH lens 400 is angularly selective with respect to an incident angle of light entering PVH lens 400. In such embodiments, PVH 400 is configured to focus or defocus subject light having an incident angle within a certain angular range relative to a normal of an optical surface (e.g., optical surfaces 401, 402) of PVH lens 400. PVH lens 400 is configured to transmit unaffected light without focusing or defocusing the unaffected light without regard to its incident angle.

Figure 4D:
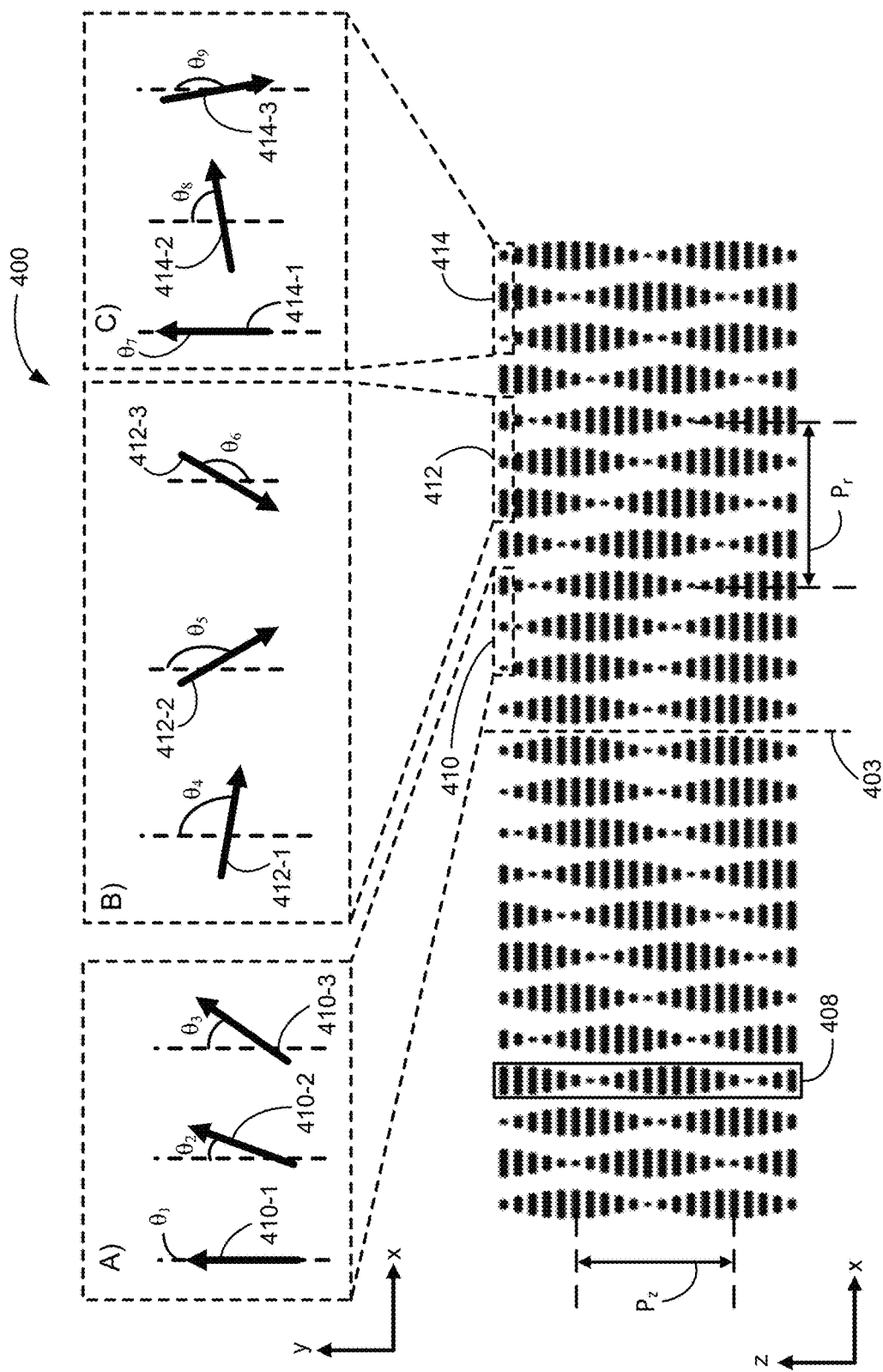
Figure 4E:
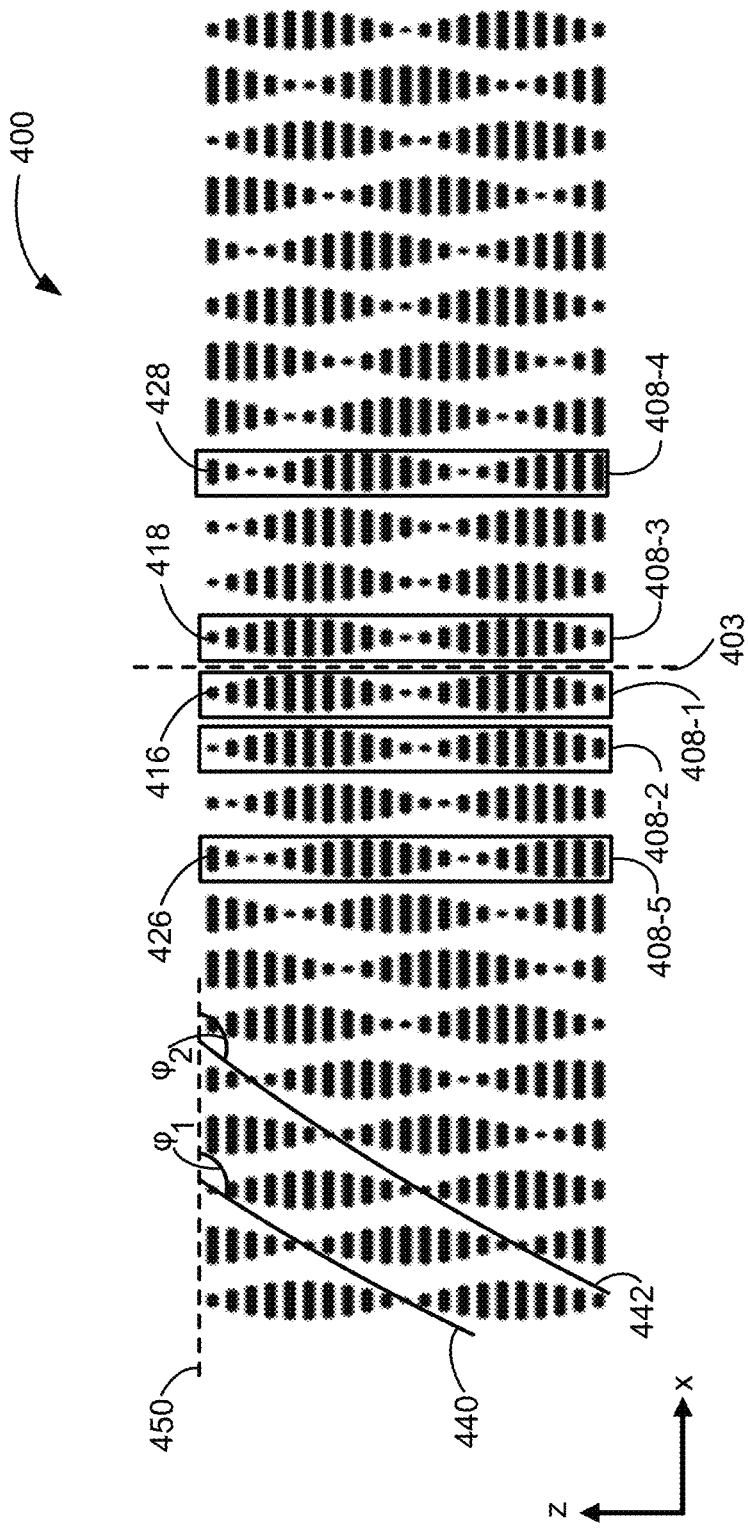

FIGS. 4D and 4E illustrate an x-z cross-sectional view of PVH lens 400.

FIG. 4D includes insets describing cycloidal pattern of helical structures 408 on an x-y reference plane. As shown in FIG. 4C, PVH lens 400 includes portions 410, 412 and 414. In some embodiments, portions 410, 412, and 414 correspond to portions 405-3, 405-2, and 405-1, respectively, described above with respect to FIG. 4C. Portion 410 includes adjacent optically anisotropic molecules 410-2, 410-4 and 410-6. Inset A of FIG. 4D shows an x-y view of optically anisotropic molecules 410-2, 410-4 and 410-6 on an x-y reference plane across PVH lens 400. In FIG. 4D, the reference plane corresponds to a top surface of PVH lens 400. As shown in inset A of FIG. 4D, optically anisotropic molecule 410-1 has a first phase on the reference plane (e.g., optically anisotropic molecule 410-1 is parallel to a reference direction of inset A marked with a dashed line). Optically anisotropic molecule 410-2 has a second phase on the reference plane, such that optically anisotropic molecule 410-2 has rotated clockwise and defines angle $\theta_1$ with respect to the reference direction. Optically anisotropic molecule 410-3 has a third phase on the reference plane, such that optically anisotropic molecule 410-3 has rotated clockwise and defines angle $\theta_2$ with respect to the reference direction. Angle $\theta_2$ is greater than angle $\theta_1$. Optically anisotropic molecules 410-1 and 410-2 define a first phase difference. As shown in inset B of FIG. 4D, optically anisotropic molecule 412-1 has a fourth phase on the reference plane. Optically anisotropic molecule 412-2 has a fifth phase on the reference plane, such that helical structure 412-2 has rotated clockwise and defines angle $\theta_5$ with respect to the reference direction. Optically anisotropic molecule 412-3 has a sixth phase on the reference plane, such that optically anisotropic molecule 412-3 has rotated clockwise and defines angle $\theta_6$ with respect to the reference direction. Angle $\theta_5$ is greater than angle $\theta_4$. Adjacent optically anisotropic molecules 412-1 and 412-2 define a second phase difference and the second phase difference is greater than the first phase difference defined by optically anisotropic molecules 410-1 and 410-2. As shown in inset C of FIG. 4D, optically anisotropic molecule 414-1 has a seventh phase on the reference plane (e.g., optically anisotropic molecule 414-1 is parallel to a reference direction of inset C marked with a dashed line). Optically anisotropic molecule 414-2 has an eighth phase on the reference plane, such that optically anisotropic molecule 414-2 has rotated clockwise and defines angle $\theta_8$ with respect to the reference direction. Optically anisotropic molecule 414-3 has a ninth phase on the reference plane, such that optically anisotropic molecule 414-3 has rotated clockwise and defines angle $\theta_9$ with respect to the reference direction. Angle $\theta_8$ is greater than angle $\theta_7$. Adjacent optically anisotropic molecule 414-1 and 414-2 define a third phase difference and the third phase difference is greater than the first phase difference defined by optically anisotropic molecule 410-1 and 410-2 and the second phase difference defined by adjacent optically anisotropic molecule 412-1 and 412-2. As illustrated by FIG. 4D, the phase difference between respective adjacent optically anisotropic molecule increases as a function of radial distance r. In other words, a rate at which the rotation of optically anisotropic molecules on the reference plane change increases as a function of radial distance r.

As shown in FIG. 4D, PVH lens 400 is a symmetric lens and an optical center of PVH lens 400 corresponds to a geometric center of PVH lens 400 (e.g., reference line 403 corresponds to the optical center or optical axis or geometric center of PVH lens 400). In FIG. 4D, a phase of adjacent optically anisotropic molecules (e.g., 410-1, 410-2, 410-3) of respective helical structures 408 change as a function of a distance from the geometric center of PVH lens 400. In some embodiments, PVH lens 400 is asymmetric so that the optical center of PVH 400 is distinct from the geometric center of PVH 400. In such embodiments, a phase of adjacent optically anisotropic molecules (e.g., 410-1, 410-2, 410-3) of respective helical structures 408 changes as a function of distance from the optical center.

Referring to FIG. 4E, in some embodiments, a central portion at the optical center of PVH lens 400 has no variation or almost zero variation in a phase between two adjacent helical configurations (e.g., 408-1 and 408-2). Also helical structures having the same distance from the center reference line 403 have the same or almost the same phase. For example, helical structure 408-1 is located at a first distance from reference line 403. Helical structure 408-3 is also located at the first distance from reference line 403. Optically anisotropic molecule 416 of helical structure 408-1 and optically anisotropic molecule 418 of helical structure 408-3 are located at a center region (e.g., the center of portion 405-4 shown in FIG. 4C) of PVH lens 400 and optically anisotropic molecule 416 and optically anisotropic molecule 418 have the same or almost the same orientation. Similarly, helical structure 408-4 and helical structure 408-5 are located at a second distance, larger than the first distance, from reference line 403, and optically anisotropic molecules 426 and 428 have the same orientation.

The rate at which the rotation of optically anisotropic molecules on the reference plane changes is characterized by a radial pitch $P_r$, which is a distance along the radius of PVH lens 400 between two optically anisotropic molecules that are rotated by 180 degrees with respect to each another on the reference plane. Thus, the higher the rate of change for the rotation of optically anisotropic molecule on the reference plane is, the shorter the radial pitch $P_r$ (or, the larger the angular or phase difference between two adjacent optically anisotropic molecules along the radial direction, the smaller the radial pitch).

Figure 4F:
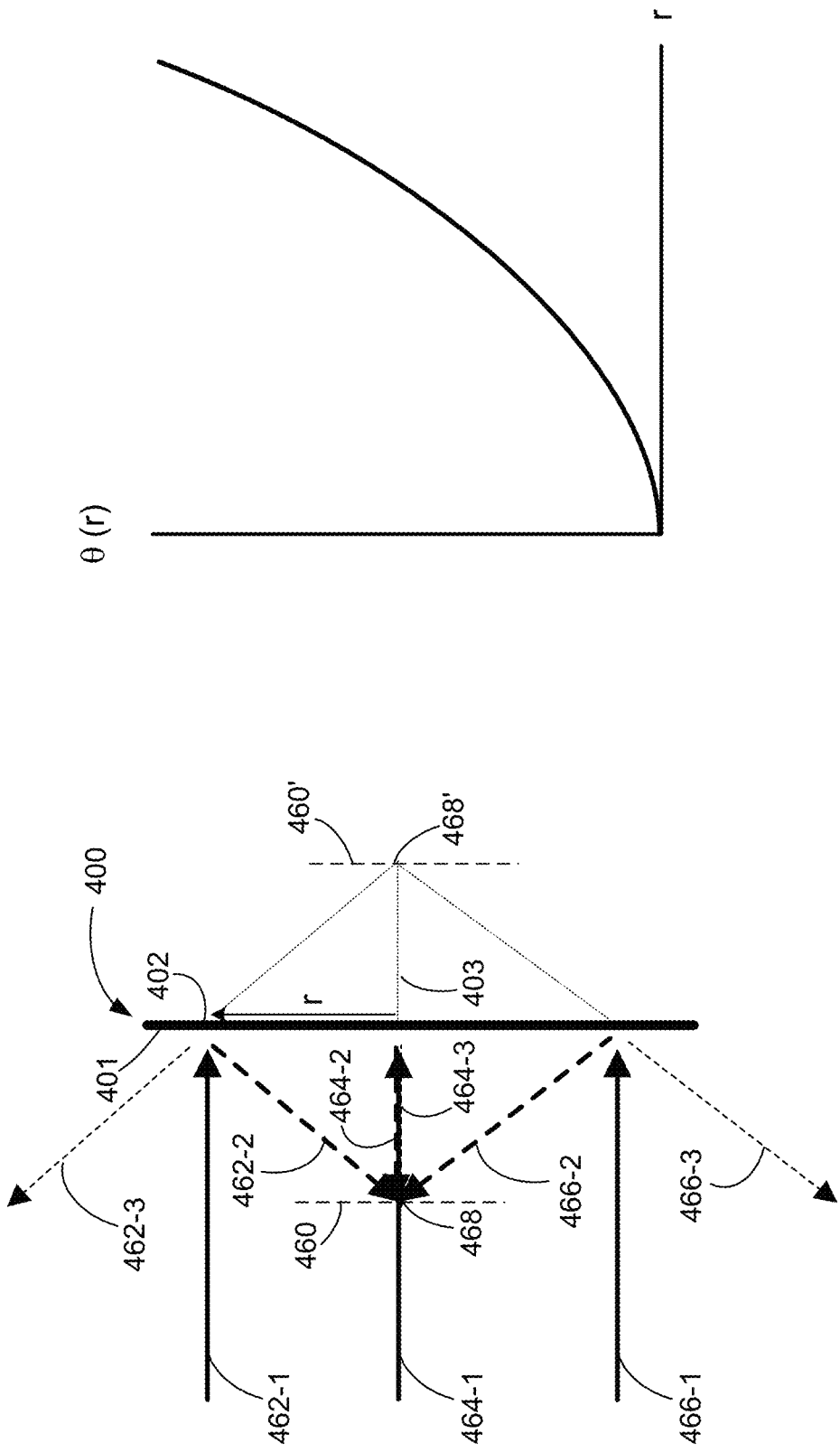
FIG. 4F is a schematic diagram illustrating optical properties of a lens in accordance with some embodiments.

FIG. 4F is a schematic diagram illustrating optical properties of lens 400 in accordance with some embodiments. In some embodiments, PVH lens 400 is a reflective lens. As shown in FIG. 4F, in some embodiments, PVH lens 400 has a focal plane 460 at a focal distance f from PVH lens 400. PVH lens 400 is configured to receive parallel subject light rays 462-1, 464-1, and 466-1 on optical surface 401 and redirect or focus subject light rays 462-1, 464-1 and 466-1 having the first circular polarization to focal point 468 on the focal plane 460, as illustrated by rays 462-2, 464-2 and 466-2. Focal plane 460 faces optical surface 401 of PVH lens 400. In some embodiments, rays 462-1 and 466-1 are incident on portion 405-1 in FIG. 4C and ray 464-1 is incident on portion 405-4 in FIG. 4C. In some embodiments, PVH lens 400 is a negative lens having a negative (or imaginary) focal plane 460' facing optical surface 402 of PVH lens 400, and rays 462-2, 464-2 and 466-2 are reflected and diverged away from the first optical surface of PVH lens 400 as rays 462-3, 464-3 and 466-3, as shown in FIG. 4F.

FIG. 4F also includes a plot showing the phase angle θ of optically anisotropic molecules on the reference plane (e.g., θ₁-θ₉ in FIG. 4D) as a function of radial distance r from the optical axis of optical PVH lens 400 shown in FIG. 4F. In certain embodiments, θ(r) is defined in accordance with Equation 2:

$$\theta(r) = \frac{\pi}{2\lambda n_{eff}}(\sqrt{f^2 + r^2} - f), \quad (2)$$

where λ corresponds to a wavelength of subject light within the certain wavelength range that PVH lens 400 is designed to operate within, f corresponds to the focal distance of PVH lens 400, $n_{eff}$ is the effective refractive index defined above in Equation 1, and r corresponds to the radial distance from the center point of PVH lens 400 on the x-y plane (e.g., along radius r shown in FIG. 4C). The plot shown in FIG. 4F is a graphical illustration of phase angle θ(r) of optically anisotropic molecules, as defined by Equation 2, of a reflective PVH lens 400 shown in FIG. 4F in accordance with some embodiments. As shown in FIG. 4F, the rate of change in the phase angle θ of optically anisotropic molecules increases as radial distance r increases. The phase angle θ(r) of optically anisotropic molecules in a reference plane can be considered to be representative of the phase angle of their respective helical structures. For ease of reference, the phase angle θ(r), referred to herein, will be representative of the phase angle of optically anisotropic molecules as well as the phase angle of their respective helical structures.

(4)

In such cases, the structure of PVH lens 400 can be defined by a radial pitch $P_r$ (e.g., illustrated in FIG. 4D) and helical pitch $P_z$ (e.g., illustrated in FIG. 4D), according to Equation 3 and Equation 4, respectively:

$$P_r = \frac{\Lambda}{\sin(\varphi)} \quad (3)$$

$$P_z = \frac{\Lambda}{\cos(\varphi)}, \quad (4)$$

where Λ is defined by Equation 5:

$$\Lambda = \frac{\lambda}{2n_{eff}\cos(\varphi)}. \quad (5)$$

φ refers to an angle between a refractive index plane defined by optically anisotropic molecules having the same phase angle in neighboring helical structures relative to a reference plane of the PVH lens, (e.g., planes 440, 442 shown in FIG. 4E). For example, FIG. 4E shows plane angel φ₁ between refractive index plane 440 and reference plane 450 as well as plane angle φ₂ between refractive index plane 440 and reference plane 450). A refractive index plane is defined by optically anisotropic molecules in PVH lens that have the same orientation (e.g., refractive index planes 440 and 442 are defined by a set of optically anisotropic molecules in PVH lens 400 that have the same orientation). In some embodiments, for a reflective lens, the plane $\varphi_{ref}$ is a function of radial distance r according to Equation 6:

$$\varphi_{ref} = \frac{\operatorname{asin}\left(\frac{-r}{\sqrt{r^2 + f^2}}\right)}{4}. \quad (6)$$

For a transmissive lens, the plane $\varphi_{trans}$ is a function of radial distance r according to Equation 7:

$$\varphi_{tran} = \frac{\pi}{2} + \frac{\operatorname{asin}\left(\frac{r}{\sqrt{r^2 + f^2}}\right)}{4}. \quad (7)$$

As shown in Equations 6 and 7, the plane angle φ and focal distance f are related. The angle at which a ray of subject light is steered or deflected (e.g., refracted and/or reflected) by a PVH lens is related to the plane angle φ of the refractive index planes of the PVH lens. A change in the plane angle φ will result in a change in direction of the reflected or refracted subject light. As described in Equations 6 and 7, the plane angle φ of a PVH lens varies with radial distance r. Specifically, as will be described below with respect to FIGS. 4G-4L, the absolute value of plane angle φ of a PVH lens increases with increasing radial distance r. This relationship allows the PVH lens to focus subject light, as rays of the subject light will be steered at steeper angles as the radial distance r of incident subject light from the optical axis increases. The design of PVH lens 400 in accordance with Equations (1) through (7) allow parallel subject light rays incident on optical surface 401 of PVH lens 400 to be deflected to a common focal point (e.g., as shown in FIG. 4F).

FIGS. 4G-4I are graphical illustrations of plane angle $\varphi_{ref}$ (defined by Equation 6) with respect to radial distance r, radial pitch $P_r$ (defined by Equation 3) with respect to radial distance r, and helical pitch $P_z$ (defined by Equation 4) of optically anisotropic molecules of a reflective lens with respect to radial distance r, respectively, in accordance with some embodiments. As shown in FIG. 4G, the absolute value of plane angle $\varphi_{ref}$ increases as a function of radial distance r and therefore, radial pitch $P_r$ decreases as a function of radial distance r. In other words, the optically anisotropic molecules rotate at faster rate as radial distance r increases. As shown in FIG. 4H, helical pitch $P_z$ for a reflective lens increases as the radial distance r increases.

FIGS. 4J-4L are graphical illustrations of plane angle $\varphi_{trans}$ (defined by Equation 7) with respect to radial distance r, radial pitch $P_r$ (defined by Equation 3) with respect to radial distance r, and helical pitch $P_z$ (defined by Equation 4) of optically anisotropic molecules of a transmissive lens with respect to radial distance r, respectively, in accordance with some embodiments. As shown in FIG. 4J, the absolute value of plane angle $\varphi_{trans}$ increases as a function of radial distance r and therefore, radial pitch $P_r$ decreases as a function of radial distance r. In other words, the optically anisotropic molecules rotate at faster rate as radial distance r increases. As shown in Figure K, helical pitch $P_z$ for a transmissive lens decreases as the radial distance r increases. It is noted that the plane angle $\varphi_{trans}$ of a transmissive lens has the opposite sign as the plane angle $\varphi_{ref}$ of a reflective lens (e.g., the plane angle $\varphi_{ref}$ of a reflective lens shown in FIG. 4G has a negative value and the plane angle $\varphi_{trans}$ of a transmissive lens shown in FIG. 4J has a positive value). It is also noted that the radial pitch values $P_r$ for reflection and transmissive lenses shown in FIGS. 4H and 4K, respectively, are infinite at the center of the lens (r~0), corresponding to a center of a PVH lens where there is no change of helical phase between two adjacent optically anisotropic molecules (e.g., see optically anisotropic molecules 416 and 418 in FIG. 4E). Also, the helical pitch $P_z$ for a transmissive lens shown in FIG. 4L goes to infinity near the center of the lens (r→0), corresponding to a center of the transmissive PVH lens where there is no or almost no twists in the helical structures.

The reflective and transmissive lenses, such as those defined above by Equations 2-7, also have different thickness requirements (e.g., thickness d shown in FIG. 4A). For a transmissive PVH lens, thickness $d_{trans}$ corresponds to a length that is at least half of a wavelength of subject light that the lens is designed to focus or defocus. In some embodiments, the thickness $d_{trans}$ of a transmissive lens is defined by Equation 8:

$$d_{trans} = \frac{\lambda}{2(n_e - n_o)}, \quad (8)$$

where $\lambda$ corresponds to a wavelength of subject light that the lens is designed to focus or defocus, $n_o$ corresponds to an ordinary refractive index and $n_e$ corresponds to an extraordinary refractive index of the PVH lens. For a reflective PVH lens, thickness $d_{ref}$ corresponds to at least $5 \times P_z$ where $P_z$ is defined by Equation 3 or Equation 4.

In some embodiments, a bandwidth for a PVH lens (e.g., a wavelength range of subject light that the PVH lens is designed to focus or defocus) is defined by Equation 9:

$$\Delta\lambda \propto P_z(n_e - n_o). \quad (9)$$

Figure 5A:
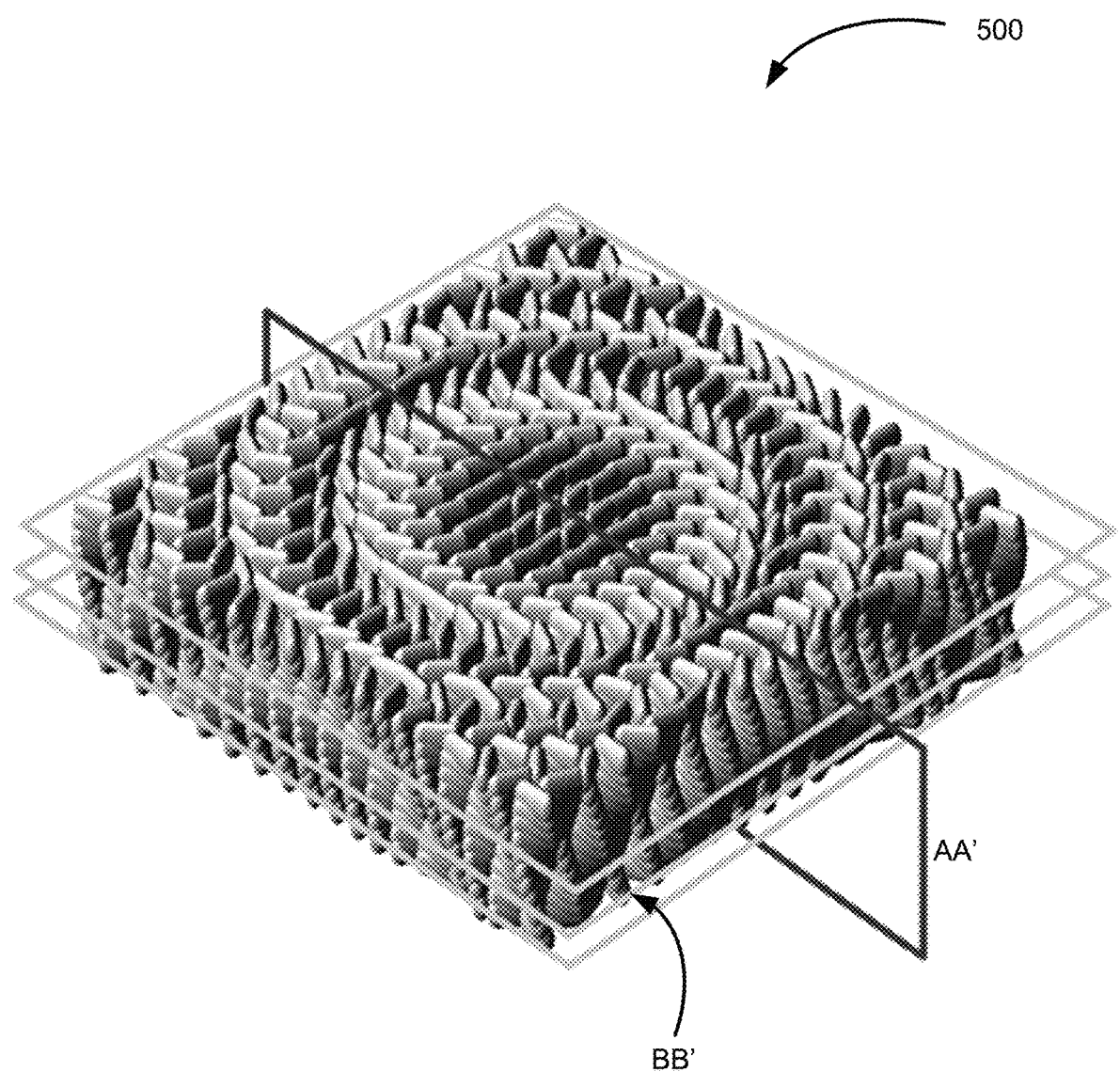
FIGS. 5A-5C are schematic diagrams illustrating a lens in accordance with some embodiments.
Figure 5B:
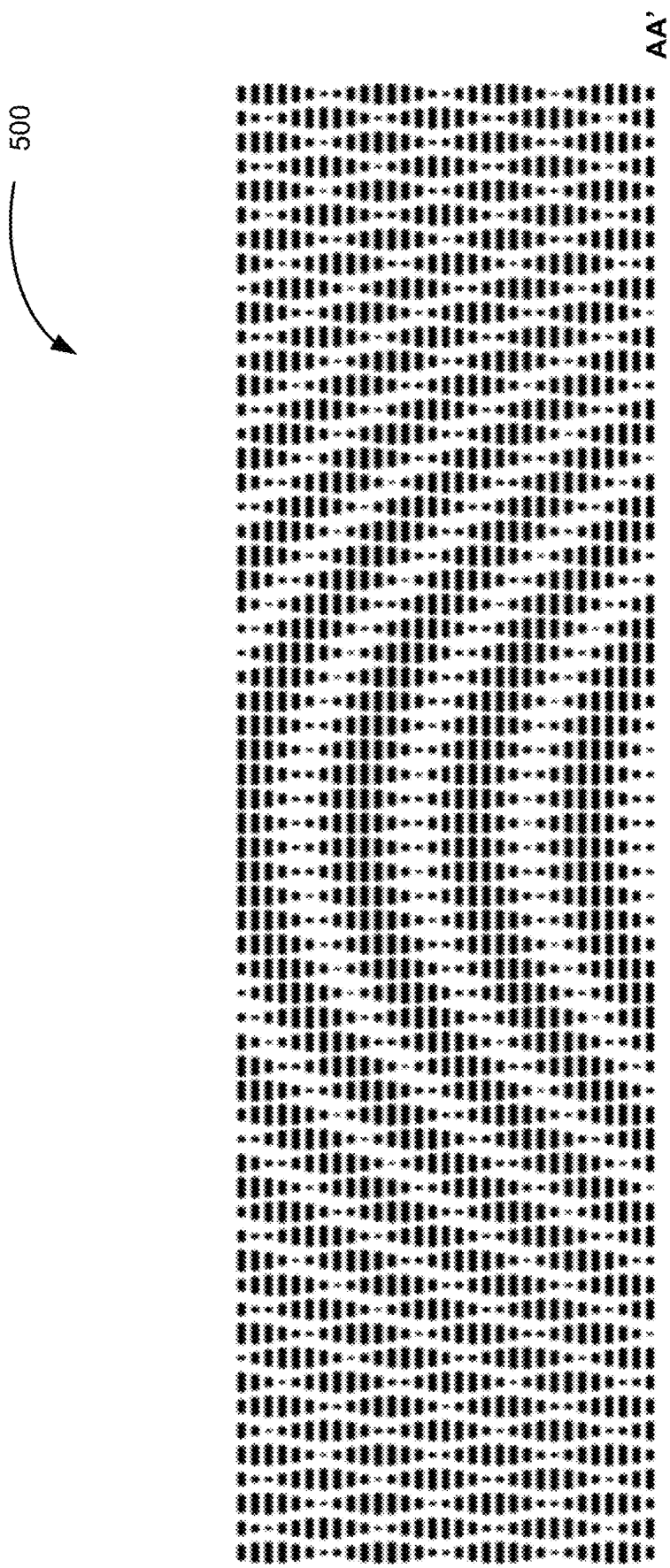
Figure 5C:
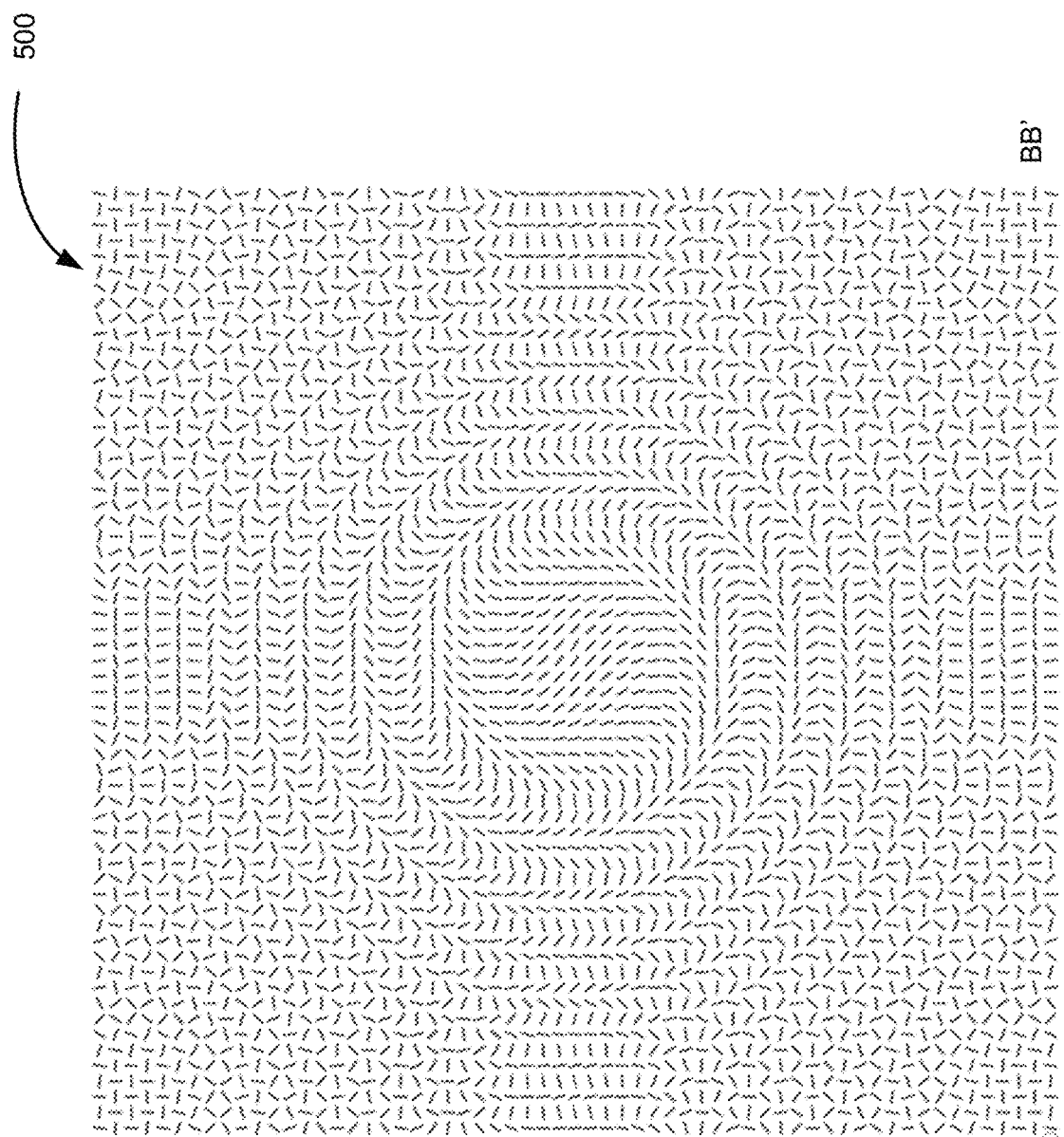

FIGS. 5A-5C are schematic diagrams illustrating helical structures in a PVH lens 500 in accordance with some embodiments. In some embodiments, PVH lens 500 is an exemplary PVH lens corresponding to PVH lens 400 described above with respect to FIGS. 4A-4E. PVH lens 500 is a reflective lens defined by Equations 2 and 3 above. FIG. 5A illustrates a three-dimensional view of PVH lens 500 including a plurality of helical structures. FIG. 5B is a cross-sectional view of PVH lens 500 across reference plane AA' illustrated in FIG. 5A. FIG. 5C is a cross-sectional view of PVH lens 500 across reference plane BB' illustrated in FIG. 5A. For example, a reflective lens defined by Equations 3-6 would have features very similar to those presented in FIGS. 5A-5C.

Figure 5D:
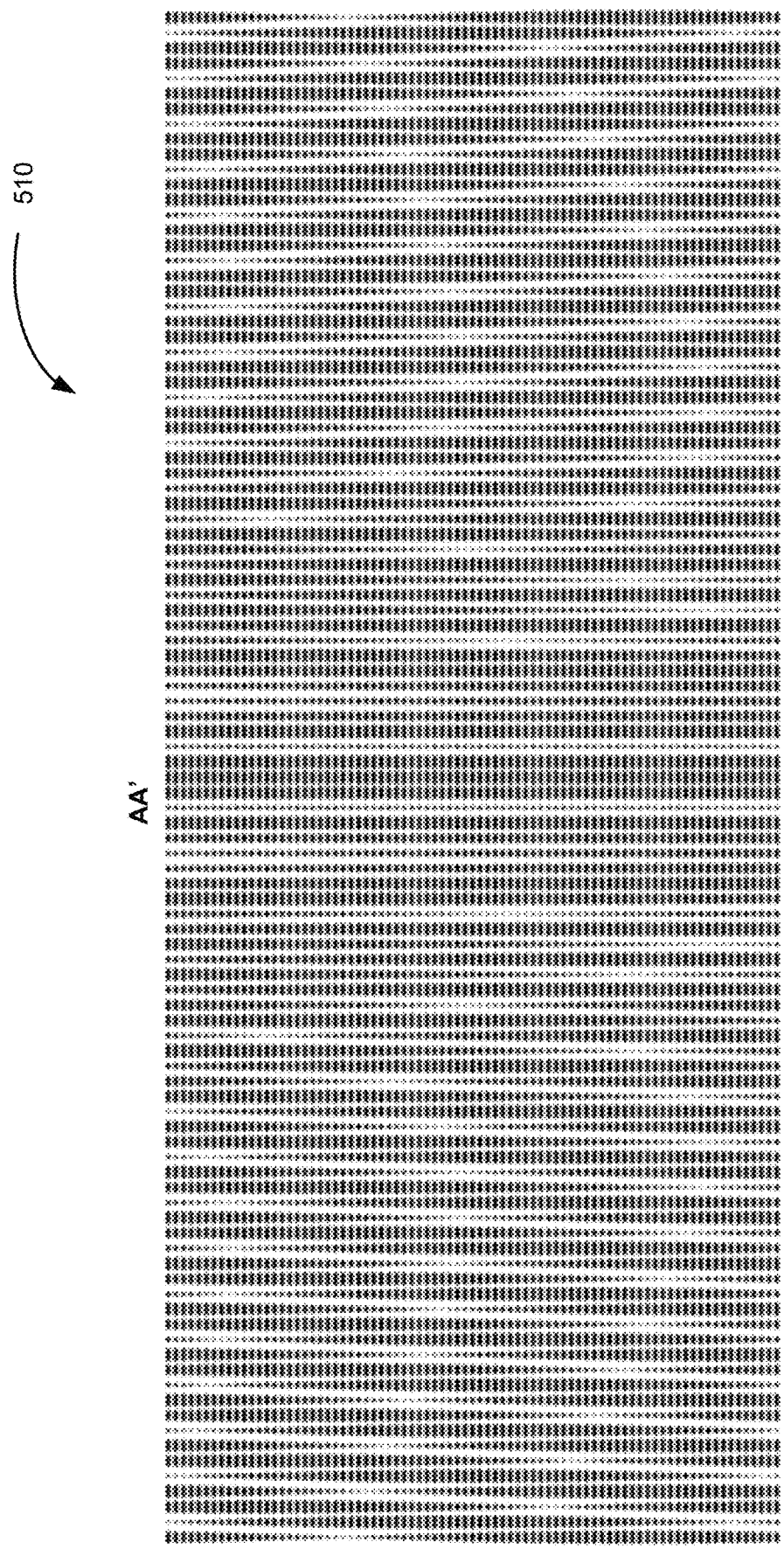
FIGS. 5D-5E are schematic diagrams illustrating a lens in accordance with some embodiments.
Figure 5E:
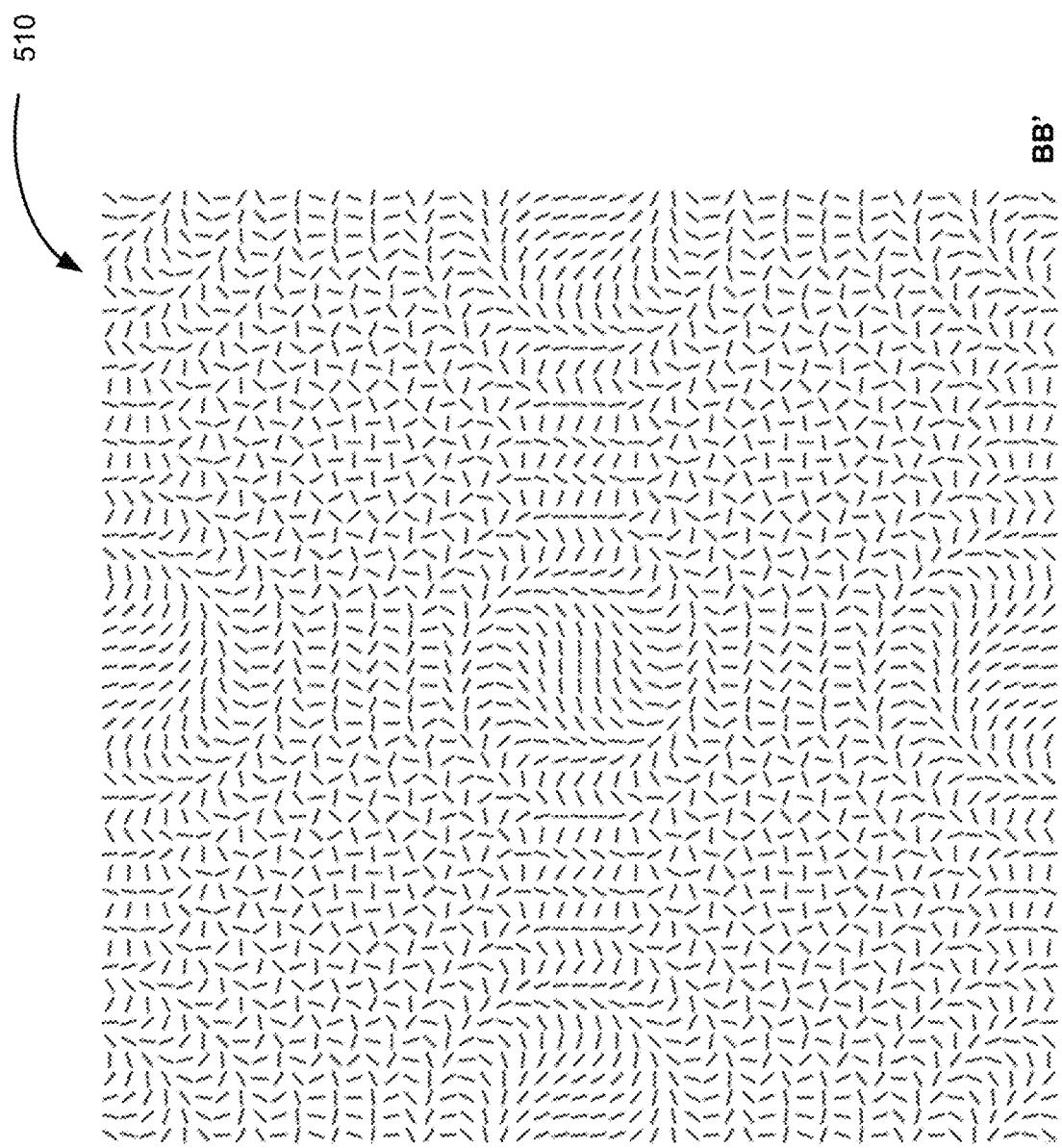

FIGS. 5D-5E are schematic diagrams illustrating structures formed by anisotropic molecule in PVH lens 510 in accordance with some embodiments. In some embodiments, PVH lens 510 is an exemplary transmissive PVH lens corresponding to PVH lens 500 described above with respect to FIG. 5A and Equations 3-5 and 7, discussed above. FIG. 5D illustrates a cross-sectional view of PVH lens 510 across a reference plane corresponding to plane AA' illustrated for PVH lens 500 in FIG. 5A. FIG. 5E illustrates an x-y cross-sectional view of PVH lens 510 across a reference plane corresponding to plane BB' illustrated for PVH lens 500 in FIG. 5B.

Figure 6A:
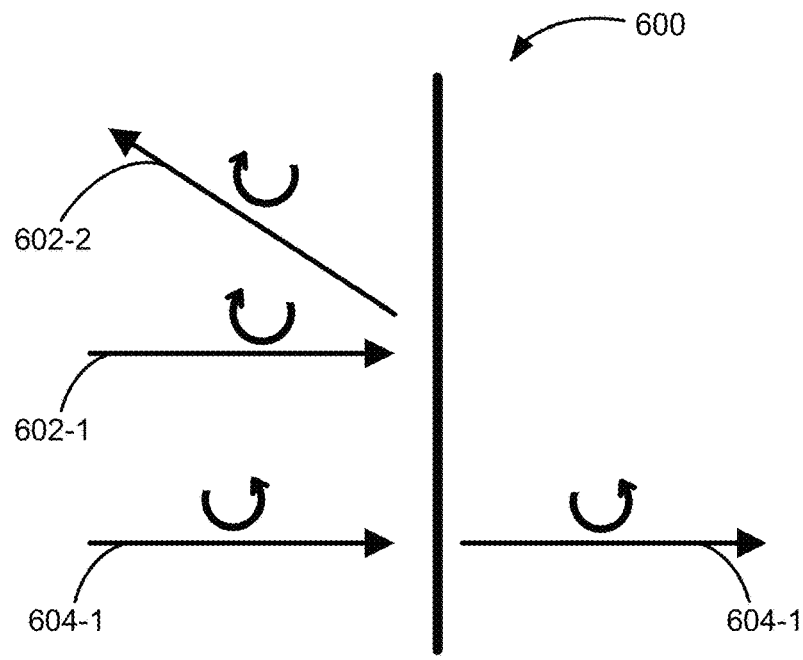
FIG. 6A is a schematic diagram illustrating a lens in accordance with some embodiments.

FIGS. 6A-6F illustrate optical properties of PVH lenses in accordance with some embodiments. FIG. 6A is a schematic diagram illustrating lens 600 in accordance with some embodiments. In some embodiments, lens 600 corresponds to PVH lens 400 described above with respect to FIG. 4A. Lens 600 is a reflective lens configured to reflect and focus (or defocus) subject light (e.g., ray 602-1) having a first circular polarization. In contrast to a conventional reflective lens and/or mirror, the polarization of subject light (e.g., ray 602-1) does not change upon reflection at lens 600. Therefore, subject light (e.g., ray 602-1) having the first circular polarization is reflected at lens 600 as ray 602-2 also having the first circular polarization. Lens 600 is also configured to transmit unaffected light (e.g., ray 604-1) having a second circular polarization, opposite to the first circular polarization, without changing its polarization or direction. Lens 600 is configured to concurrently reflect subject light and transmit unaffected light, as described above. For example, the first circular polarization is RCP and the second circular polarization is LCP, or vice versa.

Figure 6B:
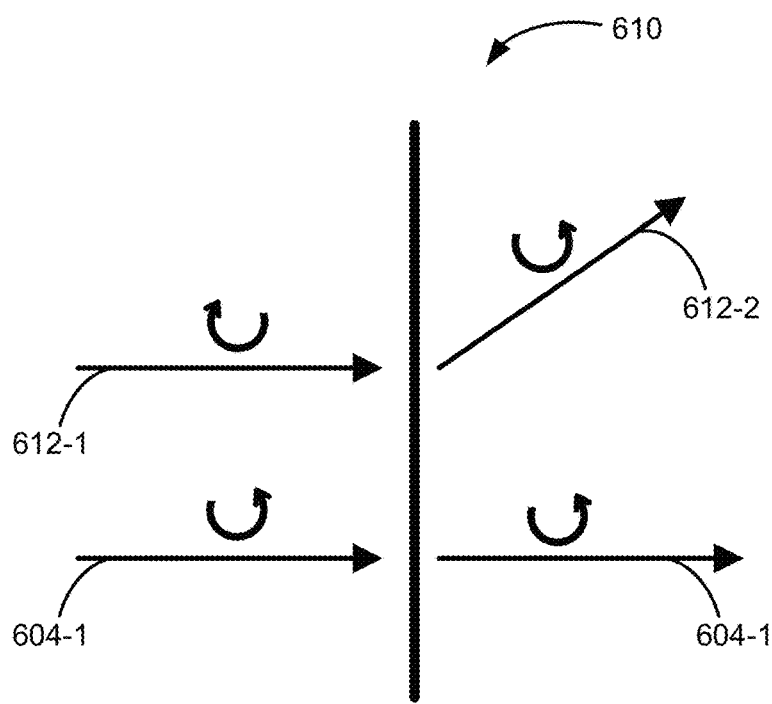
FIG. 6B is a schematic diagram illustrating a lens in accordance with some embodiments.

FIG. 6B is a schematic diagram illustrating lens 610 in accordance with some embodiments. In some embodiments, lens 610 corresponds to PVH lens 400 described above with respect to FIG. 4A. Lens 610 is a transmissive PVH lens configured to transmit and focus (or defocus) subject light (e.g., ray 612-1) having the first circular polarization. In contrast to a conventional transmissive lens and/or partial mirror, the circular polarization of subject light (e.g., ray 612-1) is changed when transmitted by lens 610. Therefore, subject light (e.g., 612-1) having the first circular polarization is transmitted by lens 610 as ray 612-2 having the second circular polarization. Lens 610 is also configured to transmit unaffected light 604-1 having the second circular polarization without changing its polarization or direction. Lens 610 is configured to concurrently transmit the subject light and the unaffected light, as described above.

Figure 6C:
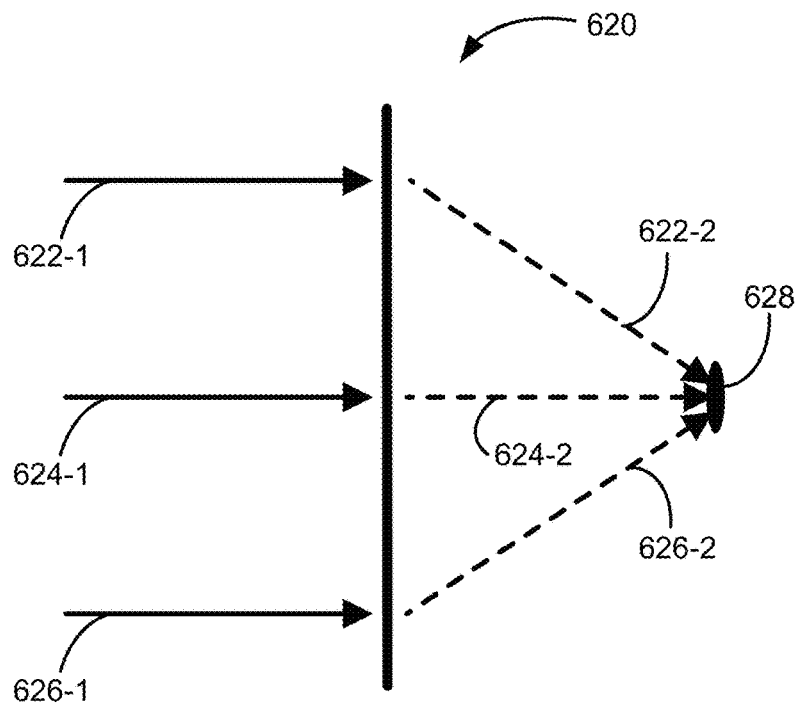
FIG. 6C is a schematic diagram illustrating a lens in accordance with some embodiments.

FIG. 6C is a schematic diagram illustrating lens 620 in accordance with some embodiments. In some embodiments, lens 620 corresponds to PVH lens 400 described above with respect to FIG. 4A. Lens 620 is a transmissive PVH lens configured to receive rays 622-1, 624-1, and 626-1 on a first optical surface and transmit and focus rays 622-1, 624-1, 626-1 having the first circular polarization to focal point 628, as illustrated by rays 622-2, 624-2 and 626-2. Focal point 628 is located facing a second optical surface of lens 620 opposite to the first optical surface. In some embodiments, rays 622-1 and 626-1 correspond to subject light focused by portion 405-1 in FIG. 4C and ray 624-1 corresponds to subject light focused by portion 405-4 in FIG. 4C. In some embodiments, lens 620 is a negative lens configured to defocus rays 622-1, 624-1 and 626-1 so that focal point 628 is a negative focal point located facing the first optical surface of lens 620 and rays 622-2, 624-2 and 626-2 are transmitted and diverged away from the second optical surface of lens 620 (not shown).

Figure 6D:
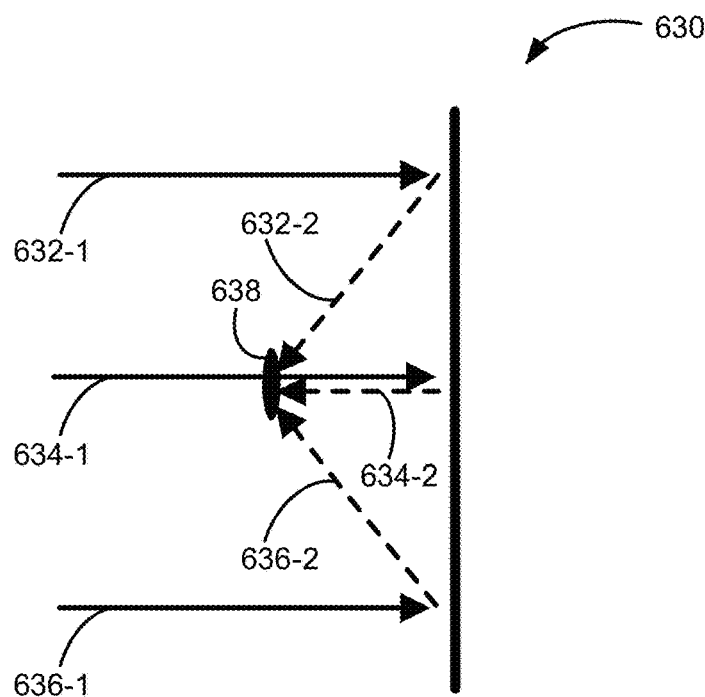
FIG. 6D is a schematic diagram illustrating a lens in accordance with some embodiments.

FIG. 6D is a schematic diagram illustrating lens 630 in accordance with some embodiments. In some embodiments, lens 630 corresponds to PVH lens 400 described above with respect to FIG. 4A. Lens 630 a reflective PVH lens configured to receive rays 632-1, 634-1, and 636-1 on a first optical surface and transmit and focus rays 632-1, 634-1 and 636-1 having the first circular polarization to focal point 638, as illustrated by rays 632-2, 634-2 and 636-2. Focal point 638 is located facing the first optical surface of lens 630. In some embodiments, rays 632-1 and 636-1 correspond to subject light focused by portion 405-1 in FIG. 4C and ray 634-1 corresponds to subject light focused by portion 405-4 in FIG. 4C. In some embodiments, lens 630 is a negative lens configured to defocus rays 632-1, 634-1 and 636-1 so that focal point 638 is a negative focal point located facing the second optical surface of lens 630 and rays 632-2, 634-2 and 636-2 are reflected and diverged away from the first optical surface of lens 630 (not shown).

Figure 6E:
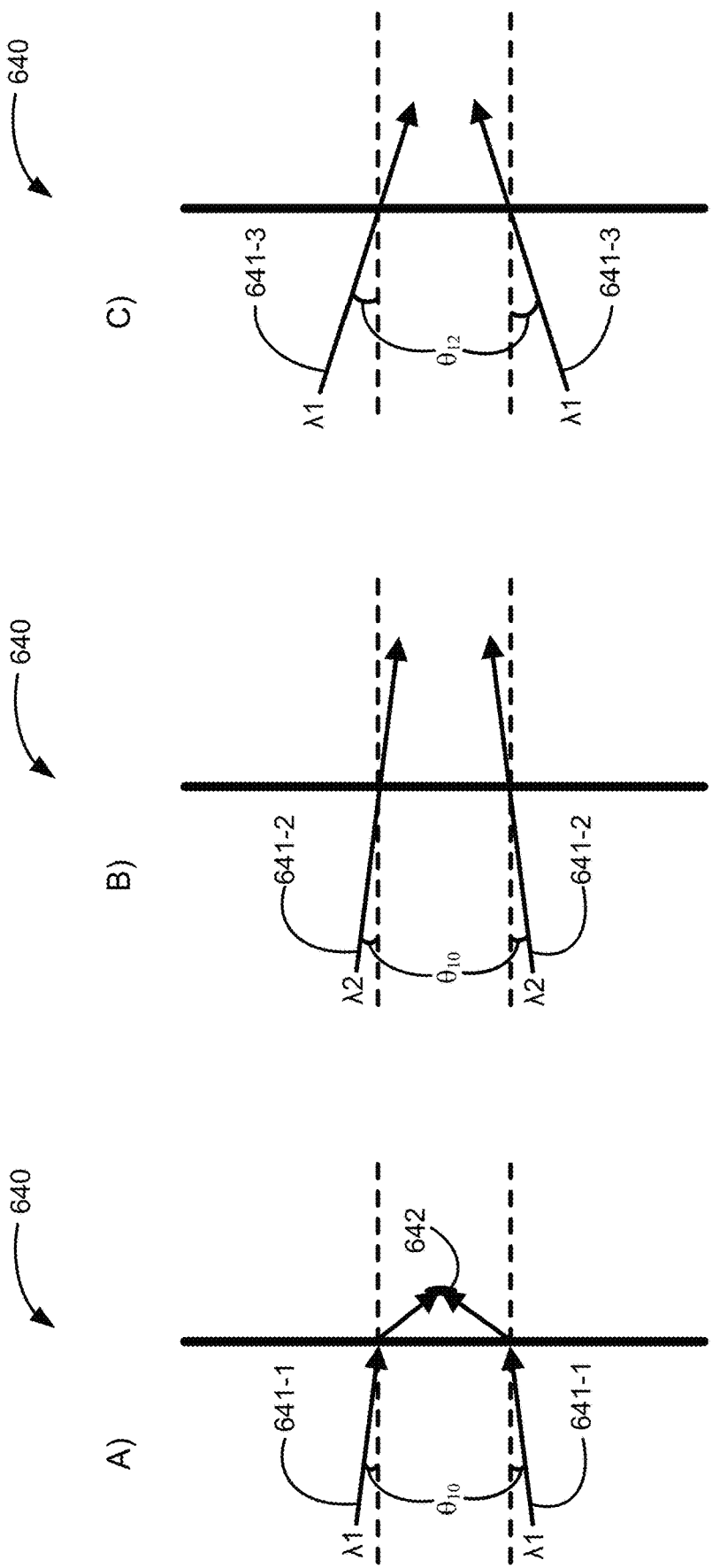
FIG. 6E is a schematic diagram illustrating a lens in accordance with some embodiments.

FIG. 6E is a schematic diagram illustrating lens 640 in accordance with some embodiments. In some embodiments, lens 640 corresponds to PVH lens 400 described above with respect to FIG. 4A. Lens 640 is a transmissive lens configured to focus light having a first circular polarization (e.g., ray 641-1 in Section A of FIG. 6E). Lens 640 has wavelength selectivity and angular selectivity. As shown in Section A of FIG. 6E, lens 640 receives ray 641-1 having wavelength $\lambda_1$ and incident angle $\theta_{10}$, and transmits and focuses ray 641-1 to focal point 642. Concurrently, lens 640 does not focus light having a wavelength different than $\lambda_1$ and/or light having incident angle different than incident angle $\theta_{10}$. As shown in Section B of FIG. 6E, lens 640 receives ray 641-2 at incident angle $\theta_{10}$ and transmits ray 641-2 without directing (e.g., focusing or defocusing) the light, because ray 641-2 has wavelength $\lambda_2$ distinct from wavelength $\lambda_1$. As shown in Section C of FIG. 6E, lens 640 receives ray 641-3 having wavelength $\lambda_1$ and transmits ray 641-3 without directing (e.g., focusing or defocusing) the light, because ray 641-3 is received at incident angle $\theta_{12}$, which is distinct from incident angle $\theta_{10}$.

Figure 6F:
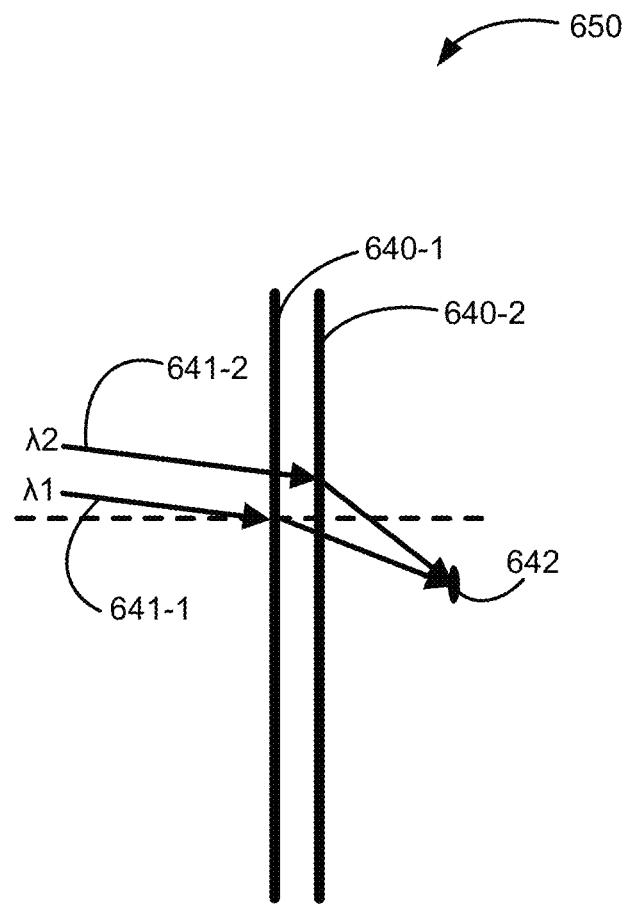
FIG. 6F is a schematic diagram illustrating a multiplex lens in accordance with some embodiments.

In some embodiments, two or more PVH lenses are coupled to form a multiplex lens. FIG. 6F is a schematic diagram illustrating multiplex lens 650 in accordance with some embodiments. Multiplex lens 650 includes lens 640-1 coupled with lens 640-2. In FIG. 6F, lens 640-1 corresponds to lens 640 described above with respect to FIG. 6E and lens 640-2 corresponds to lens 640, except that lens 640-2 is configured to focus subject light (e.g., ray 641-2) having wavelength $\lambda_2$ instead of Rays 641-1 and 641-2 are both focused onto reference point 642. In some embodiments, the two or more PVH lenses coupled to form a multiplex lens have corresponding optical properties. For example, the two or more PVH lenses are selective towards the same circular polarization, the same wavelength and the same incident angle. In some embodiments, the two or more PVH lenses coupled in a multiplex lens have distinct optical properties. For example, a first lens is configured to focus light having the first circular polarization and a second lens is configured to focus light having the second circular polarization. As another example, a first lens is configured to focus light having an incident angle within a first angular range (e.g., the first incident angle) and a second lens is configured to focus light having an incident candle within a second angular range (e.g., the second incident angle).

In light of these principles, we now turn to certain embodiments of display devices.

In accordance with some embodiments, a lens includes an optically transparent substrate having a first optical surface (e.g., optical surface 401) and a second optical surface (e.g., optical surface 402) opposite to the first optical surface (e.g., PVH lens 400 in FIG. 4A). The optically transparent substrate includes optically anisotropic molecules between the first optical surface and the second optical surface. The optically anisotropic molecules are arranged in helical configurations (e.g., helical structures 408 in FIG. 4B). The optically transparent substrate includes a first portion, a second portion and a third portion (e.g., portions 405-1, 405-2 and 405-3 in FIG. 4C). The second portion is distinct from the first portion and is located around the first portion and the third portion is distinct from the first portion and the second portion and is located around the second portion. The first portion includes a first helical structure having a first phase on a reference plane parallel to the first optical surface and a second helical structure adjacent to the first helical structure having a second phase distinct from the first phase on the reference plane (e.g., helical structure including optically anisotropic molecule 410-1 has a phase parallel to the reference direction and helical structure including optically anisotropic molecule 410-2 has a phase rotated by angle $\theta_2$ from the reference direction in the inset A of FIG. 4D). A difference between the first phase and the second phase corresponds to a first phase difference (e.g., $\Delta\theta_1 = \theta_2 - \theta_1$). The second portion includes a third helical structure having a third phase on the reference plane and a fourth helical structure adjacent to the third helical structure having a fourth phase distinct from the third phase on the reference plane (e.g., helical structure including optically anisotropic molecule 412-1 has a phase rotated by angle $\theta_4$ from the reference direction and helical structure corresponding to optically anisotropic molecule 412-2 has a phase rotated by angle $\theta_5$ from the reference direction in the inset B of FIG. 4D). A difference between the third phase and the fourth phase corresponds to a second phase difference distinct from and greater than the first phase difference (e.g., the phase difference between helical structures 412-1 and 412-2 is $\Delta\theta_2 = \theta_5 - \theta_4$ and $\Delta\theta_2 > \Delta\theta_1$). The third portion includes a fifth helical structure having a fifth phase on the reference plane and a sixth helical structure adjacent to the fifth helical structure having a sixth phase distinct from the fifth phase on the reference plane (e.g., helical structure 414-1 has a phase parallel to the reference direction and helical structure 414-2 has a phase rotated by angle $\theta_8$ from the reference direction in the inset C of FIG. 4D). A difference between the fifth phase and the sixth phase corresponds to a third phase difference distinct from the first phase difference and the second phase difference (e.g., the phase difference between helical structures 414-1 and 414-2 is $\Delta\theta_3 = \theta_8 - \theta_7$ and $\Delta\theta_3 \neq \Delta\theta_2, \Delta\theta_1$).

In some embodiments, the first optical surface is substantially flat and the second optical surface is substantially flat and parallel to the first substrate (e.g., PVH lens 400 includes optical surfaces 401 and 402, and optical surfaces 401 and 402 are substantially flat in FIG. 4A). In some embodiments, two or more lenses are coupled to form a multiplex lens (e.g., multiplex lens 650 in FIG. 6F).

In some embodiments, an optical center of the lens corresponds to a geometric center of the lens (e.g., PVH lens 400 has an optical center corresponding to a geometric center in FIG. 4C). In some embodiments, the optical center of the lens does not correspond to the geometric center of the lens (i.e., an off-axis lens).

In some embodiments, the third phase difference is greater than the second phase difference and the second phase difference is greater than the first phase difference (e.g., $\Delta\theta_3 > \Delta\theta_2 > \Delta\theta_1$, as shown in FIG. 4D).

In some embodiments, the first portion (e.g., portion 405-1 in FIG. 4C) has a first retardance profile with respect to first light of a first circular polarization, the second portion (e.g., portion 405-2) has a second retardance profile distinct from the first retardance profile with respect to the first light, and the third portion (e.g., portion 405-3) has a third retardance profile distinct from the first retardance profile and the second retardance profile with respect to the first light. In some embodiments, the first retardance profile, the second retardance profile, and the third retardance profile form a continuous overall retardance profile across the lens. The retardance profile is defined by Equation 1.

In some embodiments, a thickness of the optically transparent substrate across the optically transparent substrate (e.g., thickness d in FIG. 4A) corresponds to at least half of a wavelength of the first light. In some embodiments, the optical thickness d is defined by Equation 8.

In some embodiments, the optically anisotropic molecules are aligned along a helical axis (e.g., helical axis 406 in FIG. 4B), and the helical axis corresponds to the first circular polarization of the first light. In some embodiments, the helical axis is orthogonal to the first optical surface (e.g., helical axis 406 is orthogonal to optical surfaces 401 and 402 of PVH lens 400). In some embodiments, the optically anisotropic molecules are arranged in a single rotational direction about the helical axis (e.g., in insets A, B, and C of FIG. 4D, all helical structures rotate clockwise) all rotate in a throughout the optically transparent substrate between the first optical surface and the second optical surface.

In some embodiments, the lens is configured to change polarization of the first light from the first circular polarization to a second circular polarization distinct from the first circular polarization (e.g., lens 610 transmit incident ray 612-1 having the first circular polarization as ray 612-2 having the second circular polarization, as shown in FIG. 6B). For example, the lens can be used to reverse or modify the polarization of certain incident light In some embodiments, the first portion, the second portion, and the third portion (e.g., portions 405-1, 405-2 and 405-3 in FIG. 4C) focus the first light to a common focal point (e.g., focal point 628 in FIG. 6C).

In some embodiments, the first portion, the second portion, and the third portion are configured to receive the first light on the first optical surface and emit a focused light toward the focal point positioned facing the first optical surface from the first optical surface (e.g., lens 630 in FIG. 6D is a positive reflective lens).

In some embodiments, the first portion, the second portion, and the third portion transmit the second light without focusing the second light. In some embodiments, the polarization of the second light remains the same (e.g., lens 600 in FIG. 6A transmits ray 604-1 having the second circular polarization distinct from the first circular polarization of ray 602-1 without focusing ray 604-1 or changing its polarization).

In some embodiments, the first portion, the second portion, and the third portion transmit the third light without focusing the third light (e.g., in Section B of FIG. 6E ray 641-2 with wavelength $\lambda_2$ is transmitted without focusing ray 641-2).

In some embodiments, the first portion, the second portion, and the third portion are configured to receive the first light on the first optical surface and emit a defocused light from the first optical surface. For example, the lens is a reflective lens and a negative lens. In some embodiments, the defocused first light corresponds to light emerging from a negative focal point positioned facing the second optical surface.

In some embodiments, a thickness (e.g., thickness d in FIG. 4A) of the optically transparent substrate along a reference axis parallel to an optical surface normal of the first optical surface is at least five times the helical pitch (e.g., helical pitch $P_z$ in FIG. 4D) of the helical configurations. In some embodiments, the thickness of the lens along the optical axis is five times an average of the first helical pitch, the second helical pitch and the third helical pitch. In some embodiments, the reflection bandwidth is defined by Equation 9.

In some embodiments, the first helical configuration has a first helical pitch, the second helical configuration has a second helical pitch that is distinct from the first helical pitch, and the third helical configuration has a third helical pitch that is distinct from the first helical pitch and the second helical pitch (e.g., FIGS. 4I and 4L show helical pitch $P_z$ as a function of radial distance r from the center of a reflective lens and a transmissive lens, respectively). The helical pitch is defined as a height of one half of a helical turn along a respective helical axis (e.g., pitch $P_z$ in FIG. 4D shows the distance between two optically anisotropic molecules that are rotated 180 degrees with respect to one another).

In some embodiments, the first helical pitch is greater than the second helical pitch and the second helical pitch is greater than the third helical pitch (e.g., FIG. 4I).

In some embodiments, the first helical pitch is less than the second helical pitch and the second helical pitch is less than the third helical pitch (e.g., FIG. 4L).

In some embodiments, the first portion, the second portion, and the third portion are configured to receive the first light on the first optical surface and focus the first light toward a focal point positioned facing the second optical surface (e.g., focal point 638 in FIG. 6C).

In accordance with some embodiments, a method includes receiving first light of a first circular polarization and second light of a second circular polarization distinct from the first polarization with a lens (e.g., FIG. 6A). The lens includes an optically transparent substrate having a first optical surface and a second optical surface opposite to the first optical surface (e.g., FIG. 4A). The optically transparent substrate includes optically anisotropic molecules between the first optical surface and the second optical surface, and the optically anisotropic molecules are arranged in helical configurations (e.g., FIG. 4B). The optically transparent substrate includes a first portion, a second portion and a third portion (e.g., FIG. 4C). The second portion is distinct from the first portion and is located around the first portion, and the third portion is distinct from the first portion and the second portion and is located around the second portion. The first portion includes a first helical structure having a first phase on a reference plane parallel to the first optical surface and a second helical structure adjacent to the first helical structure having a second phase distinct from the first phase on the reference plane. A difference between the first phase and the second phase corresponds to a first phase difference. The second portion includes a third helical structure having a third phase on the reference plane and a fourth helical structure adjacent to the third helical structure having a fourth phase distinct from the third phase on the reference plane. A difference between the third phase and the fourth phase corresponds to a second phase difference distinct from the first phase difference. The third portion includes a fifth helical structure having a fifth phase on the reference plane and a sixth helical structure adjacent to the fifth helical structure having a sixth phase distinct from the fifth phase on the reference plane. A difference between the fifth phase and the sixth phase corresponds to a third phase difference distinct from the first phase difference and the second phase difference. The method also includes focusing, with the lens, the first light while transmitting the second light through the lens without focusing the second light, or defocusing, with the lens, the first light while transmitting the second light through the lens without defocusing the second light.

In accordance with some embodiment, a method for making a lens including arranging a layer of optically anisotropic molecules in helical configurations (e.g., FIG. 4B). The layer of optically anisotropic molecules includes a first portion, a second portion, and a third portion (e.g., FIG. 4C). The second portion is distinct from the first portion and is located around the first portion, and the third portion is distinct from the first portion and the second portion and is located around the second portion. The first portion includes a first helical structure having a first phase on a reference plane and a second helical structure adjacent to the first helical structure having a second phase distinct from the first phase on the reference plane (e.g., inset A of FIG. 5D). A difference between the first phase and the second phase corresponds to a first phase difference. The second portion includes a third helical structure having a third phase on the reference plane and a fourth helical structure adjacent to the third helical structure having a fourth phase distinct from the third phase on the reference plane (e.g., inset B of FIG. 5D). A difference between the third phase and the fourth phase corresponds to a second phase difference distinct from the first phase difference. The third portion includes a fifth helical structure having a fifth phase on the reference plane and a sixth helical structure adjacent to the fifth helical structure having a sixth phase distinct from the fifth phase on the reference plane (e.g., inset C of FIG. 5D). A difference between the fifth phase and the sixth phase corresponds to a third phase difference distinct from the first phase difference and the second phase difference. The method also includes firming (e.g., fixing, setting, or curing) the layer of optically anisotropic molecules. In some embodiments, the layer of optically anisotropic molecules is cured (e.g., thermal or UV curing).

In some embodiments, the method includes prior to arranging the layer of optically anisotropic molecules, obtaining a photoalignment layer (e.g., photoalignment layer 409 in FIG. 4B). The photoalignment layer is obtained by forming a first photoalignment pattern on a substrate, the first photoalignment pattern including a first cycloidal pattern (e.g., inset A of FIG. 4D), forming a second photoalignment pattern on the substrate around the first photoalignment pattern (e.g., inset B of FIG. 4D), the second photoalignment pattern including a second cycloidal pattern that is distinct from the first cycloidal pattern, and forming a third photoalignment pattern (e.g., inset A of FIG. 4D) on the substrate around the second photoalignment pattern, the third photoalignment pattern including a third cycloidal pattern that is distinct from the first cycloidal pattern and the second cycloidal pattern.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A lens, comprising:
   an optically transparent substrate having a first optical surface and a second optical surface opposite to the first optical surface, wherein:
      the optically transparent substrate includes optically anisotropic molecules between the first optical surface and the second optical surface, the optically anisotropic molecules arranged in helical structures;
      the optically transparent substrate includes a first portion, a second portion and a third portion, wherein the second portion is distinct from the first portion and is located around the first portion, and the third portion is distinct from the first portion and the second portion and is located around the second portion;
      the first portion includes a first helical structure having a first phase on a reference plane parallel to the first optical surface and a second helical structure adjacent to the first helical structure having a second phase distinct from the first phase on the reference plane, wherein a difference between the first phase and the second phase corresponds to a first phase difference;
      the second portion includes a third helical structure having a third phase on the reference plane and a fourth helical structure adjacent to the third helical structure having a fourth phase distinct from the third phase on the reference plane, wherein a difference between the third phase and the fourth phase corresponds to a second phase difference distinct from the first phase difference;
      the third portion includes a fifth helical structure having a fifth phase on the reference plane and a sixth helical structure adjacent to the fifth helical structure having a sixth phase distinct from the fifth phase on the reference plane, wherein a difference between the fifth phase and the sixth phase corresponds to a third phase difference distinct from the first phase difference and the second phase difference, wherein:
      the first helical structure has a first helical pitch, the third helical structure has a second helical pitch distinct from the first helical pitch, and the fifth helical structure has a third helical pitch that is distinct from the first helical pitch and the second helical pitch; and
      the second helical pitch has a length that is between a length of the first helical pitch and a length of the third helical pitch.

2. The lens of claim 1, wherein the third phase difference is greater than the second phase difference and the second phase difference is greater than the first phase difference.

3. The lens of claim 1, wherein the first portion has a first retardance profile, the second portion has a second retardance profile distinct from the first retardance profile, and the third portion has a third retardance profile distinct from the first retardance profile and the second retardance profile.

4. The lens of claim 1, wherein a thickness of the optically transparent substrate along a reference axis perpendicular to the first optical surface is at least five times the second helical pitch.

5. The lens of claim 1, wherein the first helical pitch is greater than the second helical pitch and the second helical pitch is greater than the third helical pitch.

6. The lens of claim 1, wherein the first helical pitch is less than the second helical pitch and the second helical pitch is less than the third helical pitch.

7. The lens of claim 1, wherein the first portion, the second portion, and the third portion are configured to receive the first light on the first optical surface and focus the first light toward a focal point positioned facing the second optical surface.

8. The lens of claim 1, wherein the optically anisotropic molecules of the optically transparent substrate have a same handedness.

9. The lens of claim 1, wherein the optically anisotropic molecules are arranged in the helical structures to:
receive first light of a first circular polarization and a second light of a second circular polarization distinct from the first polarization; and
focus or defocus the first light while transmitting the second light through the lens without focusing or defocusing the second light.

10. The lens of claim 9, wherein a thickness of the optically transparent substrate corresponds to at least half of a wavelength of the first light.

11. The lens of claim 9, wherein the optically anisotropic molecules are aligned along a helical axis, and the helical axis corresponds to the first circular polarization of the first light.

12. The lens of claim 9, wherein the lens is configured to change polarization of the first light from the first circular polarization to a second circular polarization distinct from the first circular polarization.

13. The lens of claim 9, wherein the first portion, the second portion, and the third portion are configured to receive the first light on the first optical surface and provide a defocused light from the first optical surface.

14. The lens of claim 9, wherein the first portion, the second portion, and the third portion focus the first light to a focal point.

15. The lens of claim 14, wherein the first portion, the second portion, and the third portion are configured to receive the first light on the first optical surface and provide a focused light toward the focal point positioned facing the first optical surface from the first optical surface.

16. A method for making a lens, comprising:
arranging a layer of optically anisotropic molecules in helical structures, wherein the layer of optically anisotropic molecules includes a first portion, a second portion, and a third portion, wherein the second portion is distinct from the first portion and is located around the first portion, and the third portion is distinct from the first portion and the second portion and is located around the second portion so that:
the first portion includes a first helical structure having a first phase on a reference plane and a second helical structure adjacent to the first helical structure having a second phase distinct from the first phase on the reference plane, wherein a difference between the first phase and the second phase corresponds to a first phase difference;
the second portion includes a third helical structure having a third phase on the reference plane and a fourth helical structure adjacent to the third helical structure having a fourth phase distinct from the third phase on the reference plane, wherein a difference between the third phase and the fourth phase corresponds to a second phase difference distinct from the first phase difference; and
the third portion includes a fifth helical structure having a fifth phase on the reference plane and a sixth helical structure adjacent to the fifth helical structure having a sixth phase distinct from the fifth phase on the reference plane, wherein a difference between the fifth phase and the sixth phase corresponds to a third phase difference distinct from the first phase difference and the second phase difference, wherein:
the first helical structure has a first helical pitch, the third helical structure has a second helical pitch distinct from the first helical pitch, and the fifth helical structure has a third helical pitch that is distinct from the first helical pitch and the second helical pitch; and
the second helical pitch has a length that is between a length of the first helical pitch and a length of the third helical pitch; and
firming the layer of optically anisotropic molecules.

17. The method of claim 16, including:
prior to arranging the layer of optically anisotropic molecules, obtaining a photoalignment layer by:
forming a first photoalignment pattern on a substrate, the first photoalignment pattern including a first cycloidal pattern;
forming a second photoalignment pattern on the substrate around the first photoalignment pattern, the second photoalignment pattern including a second cycloidal pattern that is distinct from the first cycloidal pattern; and
forming a third photoalignment pattern on the substrate around the second photoalignment pattern, the third photoalignment pattern including a third cycloidal pattern that is distinct from the first cycloidal pattern and the second cycloidal pattern.

18. A method, comprising:
receiving first light of a first circular polarization and second light of a second circular polarization distinct from the first polarization with a lens including an optically transparent substrate having a first optical surface and a second optical surface opposite to the first optical surface, wherein:
the optically transparent substrate includes optically anisotropic molecules between the first optical surface and the second optical surface, the optically anisotropic molecules arranged in helical structures;
the optically transparent substrate includes a first portion, a second portion and a third portion, wherein the second portion is distinct from the first portion and is located around the first portion, and the third portion is distinct from the first portion and the second portion and is located around the second portion;
the first portion includes a first helical structure having a first phase on a reference plane parallel to the first optical surface and a second helical structure adjacent to the first helical structure having a second phase distinct from the first phase on the reference plane, wherein a difference between the first phase and the second phase corresponds to a first phase difference;
the second portion includes a third helical structure having a third phase on the reference plane and a fourth helical structure adjacent to the third helical structure having a fourth phase distinct from the third phase on the reference plane, wherein a difference between the third phase and the fourth phase corresponds to a second phase difference distinct from the first phase difference; and
the third portion includes a fifth helical structure having a fifth phase on the reference plane and a sixth helical structure adjacent to the fifth helical structure having a sixth phase distinct from the fifth phase on the reference plane, wherein a difference between the fifth phase and the sixth phase corresponds to a third phase difference distinct from the first phase difference and the second phase difference, wherein:
- the first helical structure has a first helical pitch, the third helical structure has a second helical pitch distinct from the first helical pitch, and the fifth helical structure has a third helical pitch that is distinct from the first helical pitch and the second helical pitch; and
- the second helical pitch has a length that is between a length of the first helical pitch and a length of the third helical pitch; and focusing, with the lens, the first light while transmitting the second light through the lens without focusing the second light, or defocusing, with the lens, the first light while transmitting the second light through the lens without defocusing the second light.

19. The method of claim 18, wherein the third phase difference is greater than the second phase difference and the second phase difference is greater than the first phase difference.

20. The method of claim 18, wherein the first portion has a first retardance profile, the second portion has a second retardance profile distinct from the first retardance profile, and the third portion has a third retardance profile distinct from the first retardance profile and the second retardance profile.

* * * * *